(12) United States Patent
Sevindik et al.

(10) Patent No.: US 11,563,593 B2
(45) Date of Patent: Jan. 24, 2023

(54) METHODS AND APPARATUS FOR COORDINATION BETWEEN WIRELINE BACKHAUL AND WIRELESS SYSTEMS

(71) Applicant: CHARTER COMMUNICATIONS OPERATING, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/997,776

(22) Filed: Aug. 19, 2020

(65) Prior Publication Data
US 2022/0060347 A1    Feb. 24, 2022

(51) Int. Cl.
| | |
|---|---|
| *H04N 21/236* | (2011.01) |
| *H04N 21/2365* | (2011.01) |
| *H04N 21/437* | (2011.01) |
| *H04N 21/438* | (2011.01) |
| *H04N 21/61* | (2011.01) |
| *H04L 12/28* | (2006.01) |
| *H04N 7/173* | (2011.01) |
| *H04W 28/06* | (2009.01) |

(52) U.S. Cl.
CPC ..... *H04L 12/2801* (2013.01); *H04N 7/17309* (2013.01); *H04N 21/6118* (2013.01); *H04W 28/06* (2013.01)

(58) Field of Classification Search
None
See application file for complete search history.

(56) References Cited

U.S. PATENT DOCUMENTS

| | | | |
|---|---|---|---|
| 3,629,862 | A | 12/1971 | Chow |
| 6,177,963 | B1 | 1/2001 | Foye et al. |
| 7,656,890 | B2 | 2/2010 | Chapman et al. |

(Continued)

OTHER PUBLICATIONS

CableLabs, Invention Disclosure 60436, Apr. 2014, https://www.cablelabs.com/wp-content/uploads/2014/04/60436-publish.pdf.

(Continued)

*Primary Examiner* — Brian T Pendleton
*Assistant Examiner* — Jean D Saint Cyr
(74) *Attorney, Agent, or Firm* — Patent Beach PC

(57) ABSTRACT

Methods and apparatus for enhancing communication and performance for a device backhauled by a wireline communication network. In one embodiment, the device comprises a small-cell or other wireless base station that is backhauled by a DOCSIS system within a managed HFC network, and the method and apparatus enable enhanced communication between the small cell/base station and the backhaul network so as to support "rate matching" between the device to mitigate packet overflow or other issues. In one implementation, enhanced cable modem (CM) and base station devices coordinate to inform the base station of the modulation order (and/or other parameters related to transmission of the data destined for the base station on the backhaul) so that the base station can selectively invoke utilization of higher-order modulation and/or coding schemes, as well as spatial multiplexing or beamforming.

20 Claims, 17 Drawing Sheets

(56) References Cited

U.S. PATENT DOCUMENTS

| | | | |
|---|---|---|---|
| 8,005,083 B1 | 8/2011 | Diep | |
| 8,041,335 B2 | 10/2011 | Khetawat et al. | |
| 9,203,639 B2 | 12/2015 | Thibeault et al. | |
| 9,231,748 B1 | 1/2016 | Wurtenberger et al. | |
| 9,467,867 B1 | 10/2016 | Hasegawa et al. | |
| 9,655,127 B1 | 5/2017 | Srinivas et al. | |
| 9,814,044 B1 | 11/2017 | Sevindik | |
| 10,045,070 B2 | 8/2018 | Markley et al. | |
| 10,575,232 B2 | 2/2020 | Tsuda et al. | |
| 11,051,312 B1 | 6/2021 | Marupaduga et al. | |
| 2003/0027577 A1 | 2/2003 | Brown et al. | |
| 2005/0163196 A1 | 7/2005 | Currivan et al. | |
| 2005/0220047 A1* | 10/2005 | Baey | H04L 1/0017 370/315 |
| 2005/0249117 A1 | 11/2005 | Gerkins | |
| 2007/0271588 A1* | 11/2007 | Bunn | C04B 41/48 725/111 |
| 2008/0037429 A1 | 2/2008 | Lansing et al. | |
| 2008/0130589 A1 | 6/2008 | Gorokhov et al. | |
| 2008/0193137 A1 | 8/2008 | Thompson et al. | |
| 2008/0220047 A1* | 9/2008 | Sawhney | A61L 27/54 424/426 |
| 2009/0116594 A1 | 5/2009 | Abe et al. | |
| 2009/0180490 A1 | 7/2009 | Beser | |
| 2010/0117740 A1 | 5/2010 | Hwang et al. | |
| 2010/0222003 A1 | 9/2010 | Yoshii et al. | |
| 2010/0312892 A1 | 12/2010 | Woundy et al. | |
| 2011/0045856 A1 | 2/2011 | Feng et al. | |
| 2011/0142017 A1 | 6/2011 | Coldren | |
| 2011/0185263 A1 | 7/2011 | Chapman et al. | |
| 2011/0267253 A1 | 11/2011 | Bit-Babik et al. | |
| 2011/0268008 A1 | 11/2011 | Kim et al. | |
| 2011/0287794 A1 | 11/2011 | Koskela et al. | |
| 2011/0299488 A1 | 12/2011 | Kim et al. | |
| 2011/0320631 A1 | 12/2011 | Finkelstein | |
| 2013/0010686 A1* | 1/2013 | Shatzkamer | H04W 40/00 370/328 |
| 2013/0012249 A1 | 1/2013 | Centonza et al. | |
| 2013/0021996 A1 | 1/2013 | Wang et al. | |
| 2013/0033642 A1 | 2/2013 | Wan et al. | |
| 2013/0074138 A1 | 3/2013 | Chapman | |
| 2013/0251019 A1 | 9/2013 | Kolze | |
| 2013/0316750 A1 | 11/2013 | Couch | |
| 2013/0332815 A1 | 12/2013 | Gallo et al. | |
| 2014/0010269 A1 | 1/2014 | Ling et al. | |
| 2014/0086194 A1 | 3/2014 | Sugahara | |
| 2014/0247743 A1* | 9/2014 | Seo | H04W 48/16 370/252 |
| 2014/0294052 A1 | 10/2014 | Currivan et al. | |
| 2015/0017999 A1 | 1/2015 | Chen et al. | |
| 2015/0139050 A1 | 5/2015 | Sun et al. | |
| 2015/0146712 A1 | 5/2015 | Jin | |
| 2015/0215790 A1 | 7/2015 | Davari et al. | |
| 2015/0327265 A1 | 11/2015 | Lee et al. | |
| 2015/0350912 A1 | 12/2015 | Head et al. | |
| 2015/0350949 A1 | 12/2015 | Wang et al. | |
| 2016/0036490 A1 | 2/2016 | Wu et al. | |
| 2016/0095007 A1 | 3/2016 | Tian et al. | |
| 2016/0198350 A1 | 7/2016 | Lou et al. | |
| 2016/0360553 A1 | 12/2016 | Cheng et al. | |
| 2017/0005740 A1 | 1/2017 | Yang et al. | |
| 2017/0006483 A1 | 1/2017 | Attanasio et al. | |
| 2017/0026819 A1 | 1/2017 | Xue et al. | |
| 2017/0086199 A1 | 3/2017 | Zhang et al. | |
| 2017/0093555 A1 | 3/2017 | Hamzeh et al. | |
| 2017/0265216 A1 | 9/2017 | Andreoli-Fang et al. | |
| 2017/0302378 A1 | 10/2017 | Mutalik et al. | |
| 2017/0359851 A1 | 12/2017 | Kakinada et al. | |
| 2018/0054740 A1 | 2/2018 | Furuichi | |
| 2018/0070296 A1 | 3/2018 | Srikanteswara et al. | |
| 2018/0146483 A1 | 5/2018 | Kobayashi et al. | |
| 2018/0160433 A1 | 6/2018 | Kim et al. | |
| 2018/0206235 A1 | 7/2018 | Zhu et al. | |
| 2018/0252793 A1 | 9/2018 | Hazlewood et al. | |
| 2018/0255464 A1 | 9/2018 | Fodor et al. | |
| 2018/0270103 A1 | 9/2018 | Chapman et al. | |
| 2018/0288621 A1 | 10/2018 | Markwart et al. | |
| 2019/0028220 A1 | 1/2019 | Kecicioglu et al. | |
| 2019/0028900 A1 | 1/2019 | Furuichi | |
| 2019/0037567 A1 | 1/2019 | Zhao et al. | |
| 2019/0116601 A1 | 4/2019 | Warashina | |
| 2019/0132098 A1* | 5/2019 | Wernersson | H04B 7/0695 |
| 2019/0132170 A1 | 5/2019 | Si et al. | |
| 2019/0181564 A1 | 6/2019 | Kwon et al. | |
| 2019/0268916 A1 | 8/2019 | Guo et al. | |
| 2019/0273528 A1 | 9/2019 | Watanabe | |
| 2019/0274064 A1 | 9/2019 | Chapman et al. | |
| 2019/0349066 A1* | 11/2019 | Yang | H04L 5/005 |
| 2019/0379421 A1 | 12/2019 | Niakan et al. | |
| 2019/0387413 A1 | 12/2019 | Wong et al. | |
| 2020/0022036 A1 | 1/2020 | Lee et al. | |
| 2020/0092034 A1 | 3/2020 | Jones | |
| 2020/0092736 A1 | 3/2020 | Futaki et al. | |
| 2020/0145031 A1 | 5/2020 | Karlsson et al. | |
| 2020/0145967 A1 | 5/2020 | Park et al. | |
| 2020/0187208 A1 | 6/2020 | Hou et al. | |
| 2020/0252193 A1 | 8/2020 | Finkelstein | |
| 2020/0252933 A1 | 8/2020 | Hmimy et al. | |
| 2020/0314793 A1 | 10/2020 | Kumar et al. | |
| 2020/0351717 A1 | 11/2020 | Bernstein et al. | |
| 2020/0358470 A1 | 11/2020 | Dayan et al. | |
| 2020/0413325 A1 | 12/2020 | Meredith et al. | |
| 2021/0007033 A1 | 1/2021 | Tada et al. | |
| 2021/0058879 A1 | 2/2021 | Geng et al. | |
| 2021/0083942 A1 | 3/2021 | Finkelstein | |
| 2021/0092662 A1 | 3/2021 | Takahashi et al. | |
| 2021/0126697 A1 | 4/2021 | Kumar et al. | |
| 2021/0185541 A1 | 6/2021 | Potharaju et al. | |
| 2021/0204231 A1 | 7/2021 | Harada et al. | |
| 2021/0211889 A1 | 7/2021 | Buddhikot et al. | |
| 2021/0219340 A1 | 7/2021 | Shi et al. | |
| 2021/0320399 A1 | 10/2021 | Bisiules et al. | |
| 2021/0377960 A1 | 12/2021 | Carl et al. | |
| 2021/0385662 A1 | 12/2021 | Furuichi | |
| 2021/0400046 A1 | 12/2021 | Castinado et al. | |
| 2022/0007198 A1 | 1/2022 | Mahalingam et al. | |
| 2022/0053491 A1 | 2/2022 | Sevindik et al. | |
| 2022/0060346 A1 | 2/2022 | Sevindik et al. | |
| 2022/0061090 A1 | 2/2022 | Fehrenbach et al. | |
| 2022/0078806 A1 | 3/2022 | Sevindik et al. | |
| 2022/0201778 A1 | 6/2022 | Wallburg et al. | |
| 2022/0287093 A1 | 9/2022 | Iyer et al. | |

OTHER PUBLICATIONS

CableLabs Technical Report CM-TR-MHA-V02-081209.

Chapman J.T., "Mobile Backhaul over DOCSIS", SCTE-ISBE EXPO cable-Tec, Fall Technical forum, 2017.

Deering et al., "Internet Protocol, Version 6 (Ipv6) Specification, IETF RFC 2460," Dec. 1998.

Executive Brief, "Planning Today for Next-Gen DOCSIS?", Commscope 2019.

IEEE Std. 802.11 or related standards including 802.11a/b/g/n/s/v/ac/ad/ax/ay/ba/be or 802.11-2012/2013, 802.11-2016.

"Internet Protocol, DARPA Internet Program, Protocol Specification", IETF RCF 791, Sep. 1981, 50 pages.

RFC 8034, White, et al., "Active Queue Management (AQM) Based on Proportional Integral Controller Enhanced (PIE) for Data-Over-Cable Service Interface Specifications (DOCSIS) Cable Modems", Internet Engineering Task Force (IETF), Feb. 2017.

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.

Wi-Fi Direct (including inter alia, "Wi-Fi Peer-to-Peer (P2P) Specification"), Version 1.5, 2014, Wi-Fi Alliance, 90 pages.

* cited by examiner

METHODS AND APPARATUS FOR COORDINATION BETWEEN WIRELINE BACKHAUL AND WIRELESS SYSTEMS

RELATED APPLICATIONS

This application is related to co-owned and co-pending U.S. patent application Ser. No. 16/995,407 filed Aug. 17, 2020 and entitled "METHODS AND APPARATUS FOR SPECTRUM UTILIZATION COORDINATION BETWEEN WIRELINE BACKHAUL AND WIRELESS SYSTEMS," and Ser. No. 16/996,496 filed Aug. 18, 2020 and entitled "METHODS AND APPARATUS FOR WIRELESS DEVICE ATTACHMENT IN A MANAGED NETWORK ARCHITECTURE," each of the foregoing which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networks and wireless equipment, and specifically, in one or more exemplary embodiments, to methods and apparatus for wireless and wireline network infrastructure coordination.

2. Description of Related Technology

Data communication services are now ubiquitous throughout user premises (e.g., home, office, and even vehicles). Such data communication services may be provided via a managed or unmanaged networks. For instance, a typical home has services provided by one or more network service providers via a managed network such as a cable or satellite network. These services may include content delivery (e.g., linear television, on-demand content, personal or cloud DVR, "start over," etc.), as well as so-called "over the top" third party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere," anytime," so that users (subscribers) can access the desired services (e.g., watch a movie) via a number of different receiving and rendering platforms, such as in different rooms of their house, on their mobile device while traveling, etc.

Similarly, wireless data services of varying types are now ubiquitous. Such wireless services may include for instance (i) "licensed" service, such as cellular service provided by a mobile network operator (MNO), (ii) quasi-licensed (e.g., "shared" spectrum which in some cases may be withdrawn, such as CBRS), (iii) unlicensed (such as Wi-Fi (IEEE Std. 802.11) and "unlicensed cellular" technologies such as LTE-U/LAA or NR-U, as well as IoT (Internet of Things) services.

One common model is to provide localized unlicensed "small cell" (e.g., 3GPP "femtocell") coverage via a service provider such as a terrestrial fiber or cable MSO. These small cells can leverage e.g., 3GPP unlicensed bands (such as NR-U bands in the 5 GHz range) or other spectrum such as CBRS (3.550-3.70 GHz, 3GPP Band 48), and C-Bands (3.30-5.00 GHz). Technologies for use of other bands such as 6 GHz band (5.925-7.125 GHz such as for Wi-Fi-6), and even mmWave bands (e.g., 24 GHz and above) are also under development and expected to be widely deployed in coming years.

Small cells offer great flexibility for providing effectively shared-access cellular coverage without the CAPEX and other considerations associated with a normal licensed cellular (e.g., NodeB) deployment. Since small cells are designed to service fewer users/throughput, they can also be backhauled by many existing and commonly available forms of infrastructure, such as coaxial cable networks currently managed and operated by cable MSOs. Advantageously, there is a very large base of installed coaxial cable in the U.S. (and other countries), and the cable medium itself is capable of appreciable bandwidth, especially with more recent upgrades of the backhaul infrastructure supporting the coaxial cable "last mile" (e.g., DWDM optical distribution networks, high-speed DOCSIS modem protocols, and converged/edge cable platforms such as CCAP).

Hence, cable MSOs have more recently begun deploying "small cells" (such as CBRS CBSDs, described in greater detail subsequently herein) for their enterprise and residential customers in order to provide wireless coverage and backhaul, whether in high-density urban applications, sub-urban applications, and even low-density rural applications. For instance, in rural applications, such wireless cells in effect greatly extend the last mile of installed cable, providing a wireless backhaul for e.g., residential CPE which could otherwise not be serviced due to lack of a coaxial cable. Conversely, in urban applications, wireless coverage may be spotty due to e.g., large buildings and other infrastructure, and poor coverage can affect large numbers of users due to their higher geographical/spatial density, thereby necessitating small cell use. Common to all of these deployment scenarios is the managed backhaul (e.g., cable) network.

Managed Cable Networks

Network operators deliver data services (e.g., broadband) and video products to customers using a variety of different devices, thereby enabling their users or subscribers to access data/content in a number of different contexts, both fixed (e.g., at their residence) and mobile (such as while traveling or away from home).

Data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

FIG. 1 is functional block diagram illustrating a typical prior art managed (e.g., HFC cable) content delivery network architecture 100 used to provide such data services to its users and subscribers, specifically showing a typical approach for delivery of high-speed data (broadband) services to such users via a variety of different end-user configurations.

As shown in FIG. 1 (simplified for illustration), one or more network headends 102 are in fiber communication with a plurality of nodes 113 via fiber ring and distribution network 121. The headend(s) include a DOCSIS-compliant CMTS (cable modem termination system) 103, discussed in greater detail below, which provide for downstream and upstream data communication with a plurality of user or subscriber DOCSIS cable modems (CMs) 125 which service corresponding CPE 127 such as WLAN devices, PCs, etc. The nodes 113 convert the optical domain signals to RF signals typically in the range of 42-750 MHz for downstream transmission, and likewise convert RF domain signals to optical for upstream data in the range of 0-42 MHz. Within the coaxial portion of the network 100, a plurality of amplifiers 114 and tap-off points 115 exist, so as to enable amplification and delivery of signals, respectively, to all portions of the coaxial topography. A backbone 119 connects the headend to external networks and data sources, such as via the Internet or other types of MAN/WAN/internetworks.
DOCSIS—

In a typical HFC network headend 102 (see FIG. 1A), data is packetized and routed to the requesting user based on the user's network or IP address, such as via the aforementioned high-speed DOCSIS cable modems 125, according to the well-known network-layer and DOCSIS PHY protocols.

The CMTS 103, is the central platform in enabling high speed Internet connectivity over the HFC network. The CMTS consists of various functional components, including upstream and downstream transceivers, MAC schedulers, QoS functions, security/access authentication, etc.

Another key component in the headend 102, is the Edge QAM modulator (EQAM) 205. The EQAM receives e.g., an IP unicast or multicast MPEG transport stream packet over a GigE (Gigabit Ethernet) interface, and produces transport stream on one or more RF channels for transmission over the HFC distribution network 221. The EQAM can also perform other functions such as re-stamp of Program Clock Reference (PCR) timestamps such as for de-jitter processing. Output from the EQAM 205 is combined with video signals (e.g., SDV, analog, etc.) for downstream transmission by the combiner logic 207.

While DOCSIS 3.0 is currently the prevailing technology, DOCSIS 3.1 is rapidly being deployed as an upgrade to DOCSIS 3.0. DOCSIS 3.1 brings many fundamental changes, including Orthogonal Division Multiplexing (OFDM) as the new PHY layer modulation technology. In OFDM technology, the data is converted from serial to parallel, and transmitted on multiple orthogonal carriers simultaneously. Using the orthogonal multi-carrier concept of OFDM modulation improves the downstream and upstream throughput significantly, and reduces the receiver complexity in the CM and CMTS. Furthermore, bounding narrow band subcarriers in OFDM allows creation of wide band channels from 24 MHz to 192 MHz, moving away from legacy 6 MHz (or 8 MHz) channels of the type used in traditional DOCSIS 3.0 deployments. Spectrum utilization is also increased, up to approximately 1.2 GHz.

Another feature introduced in DOCSIS 3.1, is the Low Density Parity Check Code (LDPC) in upstream and downstream to optimize efficiency, provide robustness against narrow band interferers, and burst errors. The LDPC decoding efficiencies ostensibly increase the Signal-to-Noise ratio (SNR), allowing to use higher modulation for upstream and downstream. Prior to DOCSIS.31, the highest order modulation to allow reliable transmission were 64-QAM for upstream, and 256-QAM for downstream. Due to the LDPC error correcting efficiencies, the DOCSIS 3.1 standard supports 4096-QAM in downstream, and 1024-QAM in upstream, allowing the data transmission speed close to the theoretical limits.

DOCSIS 4.0, which is the latest specification for data transmission over cable as of the date of this writing, leverages the DOCSIS 3.1 technology to expand the downstream and upstream spectrum to use full spectrum available for cable network (0 to approximately 1.8 GHz), which is about 600 MHz more than the 1.2 GHz available under DOCSIS 3.1. The Extended Spectrum DOCSIS (EDX) is designed to work over existing cable infrastructure.

Full Duplex (FDX), another feature introduced in DOCSIS 4.0, will allow upstream and downstream traffic to occupy the same part of spectrum, thus doubling the throughput by using the existing HFC network characteristics.

Unaddressed Issues of Rate Match Between Wireless Node and Backhaul—

As described previously, the CM and CMTS are the two main components in DOCSIS backhaul systems. The CM receives/transmits the signal from/to the CMTS, and provides data services to premises. The CMTS controls and manages CMs deployed within the network. Furthermore, the CMTS specifies different service flows for different traffic types, and each service flow may be associated with a given modulation type in the downlink and uplink.

In some so-called "strand-based" wireless network deployment models such as those shown in FIG. 1A, a wireless node such as a CBRS CBSD 131 is connected to the service provider core via a DOCSIS backhaul comprising the aforementioned CM (e.g., at the served premises) and a CMTS located at e.g., the service provider headend or a hub of the service provider network. As newer generation CMTS and CM devices are deployed in such applications, instances may occur where the backhaul data rate is not well matched to that of the wireless node which it services. For example, the aforementioned CBRS CBSD using 3GPP technology (e.g., LTE or 5G NR), or a 3GPP small cell such as a femtocell, may have capabilities (such as a highest modulation order of its MCS or modulation and coding scheme) of 256 QAM for LTE, for both transmitting data to an attached user device or UE (i.e., DL) and for receiving data from the UE for transmission upstream. 5G NR can utilize modulations up to 1024-QAM as of 3GPP Release 15.

Hence, when CMTS or CM transmits data using any modulation order (and/or other parameters) different than 256 QAM, a mismatch can occur. For instance, as specified in the DOCSIS 3.1 and 4.0 specifications, modulation types for downstream transmission include BPSK, QPSK, 8-QAM, 16-QAM, 32-QAM, 64-QAM, 128-QAM, 256-QAM, 512-QAM, 1024-QAM, 2048-QAM, 4096-QAM. Furthermore, DOCSIS 4.0 specifies 8192-QAM and 16384-QAM modulation orders that may optionally be used by the CMTS. DOCSIS 3.1 supports 1024-QAM and optional 2048-QAM and 4096-QAM in the upstream.

Hence, in the DL direction, data transmitted by the CMTS to the serving CM at say 2,048-QAM using an established service flow will be delivered to the base station, and buffered in its DL buffers which may eventually cause data buffer overflow, and consequently packet loss.

Conversely, on the UL, if the CM and CMTS negotiate a lower-order modulation such as 64-QAM, and the base station continues to receive data from one or more served UE at 256-QAM, its transmit buffer(s) associated with the backhaul will fill and eventually overflow, again resulting in packet loss.

While there are several factors in addition to modulation order that may determine actual UL/DL throughput rates (such as e.g., the use of spatial diversity on the wireless channels between the base station and UE, different types of FEC such as Turbo codes versus LDPC, etc.), the foregoing simplified example illustrates the basic scenario of wireless link and wireline backhaul mismatch. It is noted that higher-layer packet protocols such as TCP/IP may also contribute to such mismatch. For instance, in some scenarios, an average or comparatively low data rate may be initially utilized since the responsible protocol (e.g., TCP) does not yet know the (physical) channel capacity, and thereafter increase the amount of data (rate) with increasing channel capacity, in effect attempting to match transmission rate to channel capacity.

As such, while protocols such as TCP include flow and congestion control mechanisms such as that described above that are configured to, inter alia, prevent a receiving application from becoming overwhelmed with e.g., IP packets, these mechanisms are based on the end user device (such as the UE running the application), which may not be experiencing packet overflow, as opposed to the intermediary base station or small cell, which under prior art solutions has no mechanism to "feed back" to the transmitting CMTS or the application process generating the packets.

Moreover, due to such extant lack of coordination, the full capability of the base station/small cell and/or the backhaul may not be realized. It may be that in some cases, the backhaul can handle greater UL packet flow than the base station is nominally configured to transmit. Likewise, with proper configuration of the base station on the DL, higher-order CMTS-CM modulations may be supported without buffer overflow and packet loss.

Hence, improved apparatus and methods for coordination between the wireline (e.g., DOCSIS) backhaul and the deployed base station served by that backhaul are needed.

SUMMARY

The present disclosure addresses the foregoing needs by providing, inter alia, methods and apparatus for enhancing coordination between a wireless base station and its wireline backhaul.

In a first aspect of the disclosure, a computerized method of operating a packet network infrastructure comprising at least one packet receiver apparatus and at least one packet transmitter apparatus is described. In one embodiment, the method includes; identifying at the at least one packet receiver apparatus a first type of equipment connected to the at least one packet transmitter apparatus; based at least on the identifying, causing establishment of at least one service flow between the at least one packet receiver apparatus and the at least one packet transmitter apparatus; and causing data relating to the at least one service flow to be transmitted to the connected first type of equipment, the transmitted data configured to enable the connected first type of equipment to perform at least one of a rate-matching or configuration optimization process with respect to at least downlink data transmissions to one or more client devices thereof.

In one variant, the packet network infrastructure comprises a DOCSIS (data over cable service specification) packet data system, the at least one packet receiver apparatus comprises a cable modem termination system (CMTS), and the at least one packet transmitter apparatus comprises a cable modem (CM). In one implementation, the identifying at the at least one packet receiver apparatus a first type of equipment connected to the at least one packet transmitter apparatus comprises identifying a wireless base station connected to the CM based at least in inspecting one or more packet headers for packets transmitted to the CM, the one or more packet headers of the transmitted packets having been marked with a prescribed designation by the wireless base station.

In one configuration thereof, the wireless base station comprises a 3GPP (Third Generation Partnership Project) compliant base station operating within a quasi-licensed frequency band, and the causing data relating to the at least one service flow to be transmitted to the connected first type of equipment, the transmitted data configured to enable the connected first type of equipment to perform at least one of a rate-matching or configuration optimization process with respect to at least downlink data transmissions to one or more client devices thereof comprises causing downlink (DL) modulation order data to be transmitted.

In another variant, the causing data relating to the at least one service flow to be transmitted to the connected first type of equipment further comprises causing additional downlink (DL) channel data to be transmitted, the additional data and the DL modulation order data enabling the base station to estimate a maximum DL throughput. In one implementation, the packet network infrastructure comprises a DOCSIS (data over cable service specification) packet data system, the at least one packet receiver apparatus comprises a cable modem termination system (CMTS), and the at least one packet transmitter apparatus comprises a cable modem (CM). The enablement of the connected first type of equipment to perform at least one of a rate-matching or configuration optimization process with respect to at least downlink data transmissions to one or more client devices thereof comprises enablement of the base station to: perform at least one rate determination process to determine whether the base station can support a target maximum data rate for the DL channel; and based at least on the performance, selectively implement one or more of: (i) a modulation order change for the DL channel; (ii) a spatial multiplexing mode for the DL channel; or (iii) beamforming on the DL channel.

In another implementation, the causing establishment of at least one service flow between the at least one packet receiver apparatus and the at least one packet transmitter apparatus comprises establishing a prioritized service flow dedicated to the base station only.

In another aspect, computerized modem apparatus for use in a data network is disclosed. In one embodiment, the modem apparatus comprises: a radio frequency (RF) interface; at least one packet data interface; processor apparatus in data communication with the at least one packet data interface and the RF interface; and storage apparatus in data communication with the processor apparatus. In one variant, the storage apparatus comprising at least one computer program configured to, when executed by the processor apparatus, cause the modem apparatus to: receive first data packets via the at least one packet data interface; determine that at least a portion of the received first data packets are sourced from a wireless access node; based at least on the determination, forward the at least portion of the received first data packets that are sourced from the wireless access node to a packet receiver apparatus in data communication with the modem apparatus via at least the RF interface; and responsive to establishment of one or more service flows between the modem apparatus and the receiver apparatus for use by downstream traffic destined for the wireless access node, transmit configuration data relating to the established one or more service flows.

In one implementation, the at least one packet receiver apparatus comprises a DOCSIS cable modem termination system (CMTS), and the modem apparatus comprises a DOCSIS cable modem (CM); and the established one or more service flows utilize a modulation order greater than 256-QAM for at least downstream traffic transmission. In one configuration the transmission of the configuration data relating to the established one or more service flows comprises transmission of data indicative of the modulation order greater than 256-QAM.

In another implementation, the at least one computer program is further configured to, when executed by the processor apparatus, cause the modem apparatus to: receive data indicative of a change in at least part of the configuration data; and based at least on the received data indicative of the change, transmit second configuration data to the wireless access node. In one configuration thereof, the at least one computer program is further configured to, when executed by the processor apparatus, cause the modem apparatus to: monitor at least one aspect of a prescribed buffer associated with transmission of traffic to the wireless access node; and based at least on the monitoring, signal the wireless access node to cause a change to at least one transmission parameter associated with a wireless interface of the wireless access node.

In another variant, the prescribed buffer comprises an output transmission buffer of the computerized modem apparatus; and the at least one aspect of the prescribed buffer comprises at least one of buffer depth or fill rate.

In yet another variant, the prescribed buffer comprises an input or receive buffer of the wireless access node; and the at least one aspect of the prescribed buffer comprises at least one of buffer depth or fill rate.

In a further aspect of the disclosure, computerized wireless access node apparatus is described. In one embodiment, apparatus comprises: at least one first packet data interface for interface with a radio frequency modulation/demodulation apparatus; at least one wireless interface for interface with one or more wireless user devices; processor apparatus in data communication with the at least one first packet data interface and the at least one wireless interface; and storage apparatus in data communication with the processor apparatus, the storage apparatus comprising at least one computer program.

In one variant, the at least one computer program is configured to, when executed by the processor apparatus, cause the computerized wireless access node apparatus to: receive first data packets in at least one buffer via the at least one first packet data interface; monitor at least one parameter associated with the at least one buffer; based at least in part on the at least one parameter meeting a prescribed criterion, cause evaluation of first data relating to a configuration of a downstream channel used by the modulation/demodulation apparatus to receive the first data packets prior to transmission over the at least one first packet data interface relative to second data relating to a configuration of the at least one wireless interface; and based at least on the evaluation, cause modification to the at least one wireless interface to effect a change in effective data throughput on at least one downlink channel thereof.

In one implementation, the radio frequency modulation/demodulation apparatus comprises a cable modem within a hybrid fiber coax (HFC) network; the wireless access node comprises a 3GPP-compliant CBSD (Citizens Broadband Service Device) operative within a frequency band of 3.550 to 3.700 GHz; and the at least one parameter comprises a QAM modulation order.

In another implementation, the modification to the at least one wireless interface to effect a change in effective data throughput on at least one downlink channel thereof comprises: identification of a spatial diversity mode that increases data throughput on the at least one downlink channel over a current data throughput of the at least one downlink channel; and implementation of the identified spatial diversity mode on the at least one downlink channel. In one configuration thereof, the implementation of the identified spatial diversity mode on the at least one downlink channel further comprises: causing issuance of a request to a spectrum allocation system to enable activation of an antenna sector not then currently operating; and based at least on receipt of data indicating that the request has been granted, cause activation of the antenna sector using a prescribed PCI (physical cell identifier) value.

In another implementation, the modification to the at least one wireless interface to effect a change in effective data throughput on at least one downlink channel thereof comprises: identification of a beamforming configuration that increases data throughput on the at least one downlink channel over a current data throughput of the at least one downlink channel; and implementation of the identified beamforming configuration on the at least one downlink channel.

In one configuration, the identified beamforming configuration comprises utilization of beamforming for only a period of time and specific to a given one of the one or more wireless user devices.

In another aspect of the disclosure, methods and apparatus for implementing enhanced downlink configuration protocols are described. In one embodiment, the methods and apparatus are implemented on a user (device) specific basis, such as via implementation of separate user device-specific DL buffers which are separately managed with respect to at least one of modulation order, spatial multiplexing mode, or beamforming.

In another aspect of the disclosure, a method of operating a base station having plurality of antennas connected to wireline communication network is disclosed. In one embodiment, the method includes: receiving the data from a network; determining the modulation order of the received data from the network; determining that the base station cannot as presently configured transmit data to the client devices with the modulation order of the received data from the network; reconfiguring at least a portion of the air interface for transmission techniques for the transmission of the received data; and transmitting the data to client devices.

In one variant, the communication network includes a DOCSIS 3.1 or 4.0 enabled hybrid coaxial fiber network, and the base station is 3GPP compliant LTE, 4G/5G base station operating as a CBRS CBSD.

In another variant, the reconfiguration includes utilizing all of the antennas or a subset of antennas to enhance throughput on the air interface when it is determined that the modulation order of the data received from the network exceeds the maximum modulation order that the base station can support.

In yet another variant of the method, the method further includes: subsequent to determining the modulation order of received data, conducting, at the base station, and evaluation to determine the modulation order for the transmission of data to the client devices in order to maintain an outgoing data rate within a prescribed limit of an incoming data rate.

In another variant of the method, the turning on a subset of antennas to enhance the throughput includes, conducting, at the base station, an evaluation to determine channel capacity with different subset of antennas to determine the subset of antennas that provides the required capacity that is required to transmit the determined modulation order or data rate for the transmission of data to one or more client devices.

In another variant, the method further comprises conducting, at the base station, an evaluation to determine the channel capacity so as to determine that a reduced number of antenna is able to support the incoming data stream rate received from the wireline network.

In another variant, the method further includes utilizing MIMO transmission techniques for the transmission of the received data including: receiving the wireless channel matrix from the client device(s) (or estimating it from training data embedded in data frame on UL); computing the channel capacity for beamforming; computing the channel capacity for a spatial multiplexing mode; conducting an evaluation to determine whether beamforming or spatial multiplexing mode provides higher throughput; and utilizing the MIMO mode that provides the higher throughput for the transmission of data to the client devices.

In another aspect of the disclosure, a computerized method of operating a communication network having at least one modem, at least one base station having plurality of antennas in communication with the at least one access node, and one headend node in communication with the at least one modem is disclosed. In one embodiment, the method includes: configuring the at least one modem with data service flows, including one high speed service flow for each of the at least one base station connected to the at least one access node; transmitting the data service flow parameters to the at least one base station from the headend node to the at least one base station via the at least one modem; transmitting data to the at least one base station via the at least one modem; receiving data from the headend node at the at least one base station; processing the received data at the at least one base station to determine service flow data parameters; determining the data stream parameters for transmission of the data to client devices; selecting MIMO transmit mode for transmitting the data to one or more client devices; and transmitting the data streams to the one or more client devices utilizing the selected MIMO transmit mode.

In one variant, transmitting the data service flow parameters to the at least one base station includes transmitting modulation order and data rate data.

In another variant, the method further includes transmitting data service flow parameters to the at least one base station using at least one of (i) a periodic schedule, or (ii) whenever a modulation type or order is changed by the headend node.

In yet another variant, processing the received data at the at least one base station to determine service flow data parameters includes determining the data rate and modulation order of data which the at least one base station is able to transmit to the client devices.

In another variant, utilizing a selected MIMO transmit mode includes determining the number of transmit antennas that is required to transmit the data to the client devices at rate bearing a prescribed relationship to the incoming data rate from the wireline network; computing the channel capacity for a beamforming mode; computing a channel capacity for spatial multiplexing mode; determining which antenna modes provides a higher capacity; and utilizing the antenna mode that provides higher capacity for transmitting data to the one or more client devices.

In one variant, the data network includes a DOCSIS 3.1 or 4.0 enabled hybrid coaxial fiber network, and base station is a 3GPP compliant LTE 4G or 5G NR base station.

In a further variant, the base station device is configured to operate within a frequency range between 3.550 and 3.70 GHz inclusive, and the transmitting data to the client devices includes causing of establishment of a wireless connection to the client devices device includes causing a request to be issued to a SAS (spectrum allocation system) in data communication with the wireless network to obtain at least one spectrum grant, at least one frequency within the at least one spectrum grant being utilized to establish the wireless connection.

In another aspect of the disclosure, computerized premises apparatus for use in a wireless network is described. In one embodiment, the apparatus includes: at least one wireless interface; processor apparatus in data communication with the at least one wireless interface; at least one network backhaul interface; and storage apparatus in data communication with the processor apparatus.

In one variant, the storage apparatus comprises at least one computer program configured to, when executed by the processor apparatus: engage in communication with one network device via the at least one network backhaul interface of the computerized premises apparatus; obtain data from the network device related to service data flow allocated to the premises; determining a data transmission configuration from the obtained data, the configuration for the transmission of data to one or more client devices using the antennas of the computerized device; enabling establishment of a wireless connection between the computerized premises apparatus and the one or more client devices; utilize the at least one network device to request a resource grant; and based at least on a criterion relating to performance or capability, utilize a transmission mode to transmit data to the one or more client device within ae frequency band provided via the resource grant.

In one implementation, the computerized premises apparatus includes a 3GPP-compliant NodeB (xNB) configured to operate in a CBRS frequency band; and the network device includes a DOCSIS 3.1 or DOCSIS 4.0 compliant modem.

In another implementation, the at least one computer program is further configured to, when executed by the processor apparatus: obtain a network modulation order utilized for the transmission of data to the network device; determine a relationship between the network modulation order and a maximum modulation order that the base station is able to transmit; and selectively reconfiguring at least one of a beamforming mode or spatial multiplexing mode when the network modulation order exceeds the baste station maximum order.

In one configuration, the at least one computer program is further configured to, when executed by the processor apparatus: utilize a transport layer process to enable aggregation of data packets transmitted to the computerized premises apparatus via the wireless connection and the second wireless connection when the wireless connection and the second wireless connection have been established.

In a further aspect of the disclosure, computer readable apparatus including a non-transitory storage medium, the non-transitory medium including at least one computer program having a plurality of instructions is disclosed. In one embodiment, the plurality of instructions are configured to, when executed on a processing apparatus: receive data relating to a constellation configuration used for transmission of data between a network and a modem for delivery to a base station connected to the modem, and based on the received data, adjust at least one of a spatial multiplexing or beamforming mode of operation for the base station.

In one variant, the storage apparatus includes a storage medium configured to store one or more computer programs, such as on a base station or fixed wireless receiver of a managed wireless network. In one embodiment, the apparatus includes a program memory or HDD or SDD and stores one or more computer programs.

In another aspect, methods and apparatus for communication coordination for delivery/receipt of signals to/from one or more network head end to base station are disclosed. In one embodiment, the communication coordination includes data messaging between the one or more base station and headend via cable modems.

In another aspect, a cable modem apparatus is disclosed. In one embodiment, the cable modem apparatus is configured to communicate data relating to data communication between itself and a network node (e.g., CMTS) to a connected downstream base station in order to better match one or more of DL or UL data operations by the base station to the backhaul.

These and other aspects shall become apparent when considered in light of the disclosure provided herein.

Figure 1:
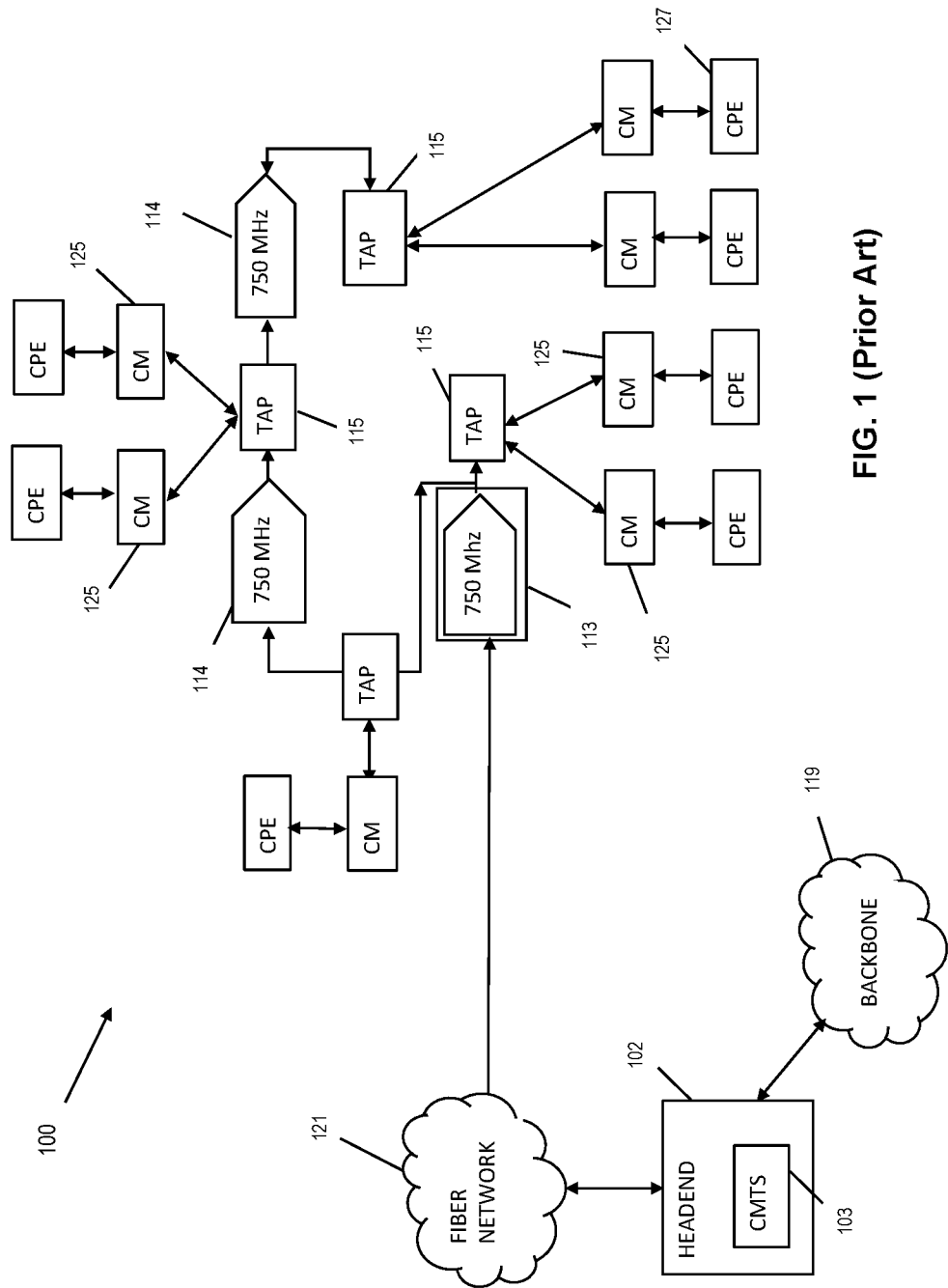
FIG. 1 is a block diagram illustrating a prior art hybrid fiber-coaxial (HFC) data network for delivery of data to end user devices.
Figure 1A:
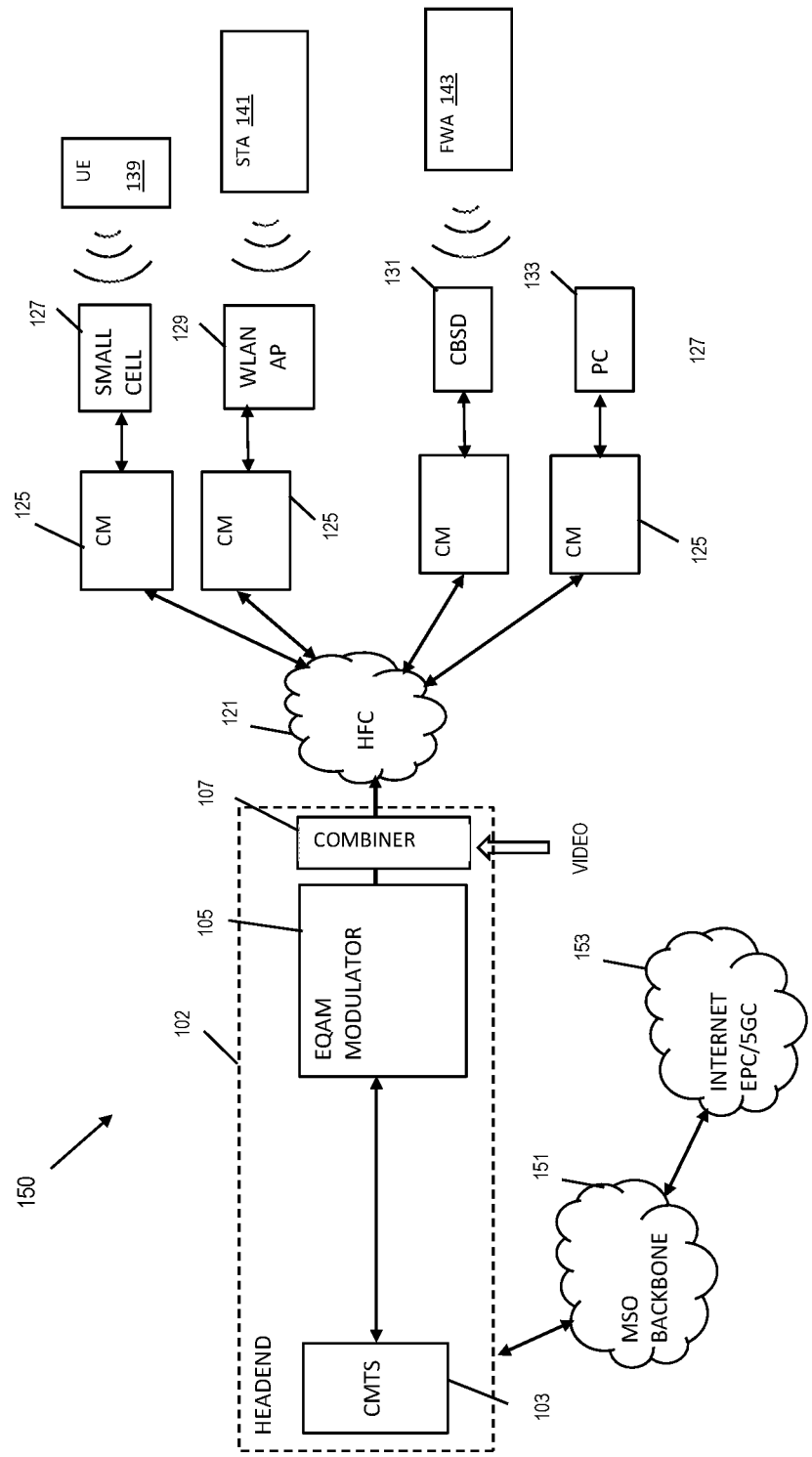
FIG. 1A is a block diagram illustrating the DOCSIS infrastructure of the HFC network of FIG. 1, and various types of backhauled premises devices.

All Figures © Copyright 2019-2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in Signaling Protocols and Procedures for Citizens Broadband Radio Service (CBRS): Spectrum Access System (SAS)—Citizens Broadband Radio Service Device (CBSD) Interface Technical Specification—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, FWA devices, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0 and any EuroDOCSIS counterparts or derivatives relating thereto.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory, stacked memory such as HBM/HBM2, and spin Ram, PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAE (Spectrum Allocation Entity)" refers without limitation to one or more entities or processes which are tasked with or function to allocate quasi-licensed spectrum to users. Examples of SAEs include SAS (CBRS). PMSE management entities, and LSA Controllers or Repositories.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a CPE/FWA or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ad/ax/ay/ba/be or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term wireline includes electrical and optical transmission media such as, without limitation, coaxial cable, CAT-5/6 cable, and optical fiber.

As used herein, the term "xNB" refers to any 3GPP-compliant node including without limitation eNBs (eU-TRAN) and gNBs (5G NR).

Overview

In one exemplary aspect, the present disclosure provides methods and apparatus for enhancing coordination and throughput of base stations (CBSD/xNB) that are backhauled by wireline networks such as DOCSIS cable networks. In one embodiment, spatial multiplexing processing and beamforming techniques are used in conjunction with enhanced communication between the base station and its backhaul network so as to better match effective throughput on the DL (and UL) as a whole, and on a user device-specific basis when needed.

In one variant, the base station has a process operative thereon (e.g., a "rate matcher") that, inter alia, enables selective utilization of the foregoing mechanisms for supporting higher modulation orders supported by incipient DOCSIS network technologies such as DOCSIS 3.1 and 4.0.

In one implementation, the CBSD/xNB can increase the number of active antennas and associated RF transceiver chains via a spatial multiplexing mode, and also selectively enable beamforming to increase its data rate when the expected throughput of the backhaul is higher than that of the base station (e.g., the transmitted modulation order used by the DOCSIS network on the DL is higher than the highest modulation order supported by the CBSD/xNB). If the CMTS subsequently transmits using a lower modulation order, the CBSD/xNB will reduce the number of active antennas/multiplexing mode, and will turn off their associated RF chains to reduce the power consumption by the base station.

In another implementation, the CBSD/xNB computes the expected throughput for beamforming or spatial multiplexing mode (i.e., as alternatives), and decides to enable the beamforming or spatial multiplexing mode based on its programmed selection criteria such as which provides higher data throughput. In one such implementation, user (device)-specific download buffers are used within the base station such that different user's traffic can be differentially treated with respect to e.g., beamforming, queue management techniques such as AQM, etc.

Employing the coordination, and the beamforming or spatial multiplexing techniques discussed above provides enhanced DL and UL capacity for the user devices without the need to install additional infrastructure such as more CBSDs and associated backhaul, thereby effectively enabling addition of more customers to the network with a given CAPEX (capital expenditure). Moreover, by eliminating packet losses enhances network operation, such as by obviating retransmission requests by the destination application when the lost packets do not arrive.

The methods and apparatus described herein may also advantageously be extended to other shared-access architectures (i.e., other than CBRS) such as for example DSA, LSA, and TVWS systems which are backhauled by a wireline modem, and can also be extended to mmWave systems.

Detailed Description of Exemplary Embodiments

Exemplary embodiments of the apparatus and methods of the present disclosure are now described in detail. While these exemplary embodiments are described in the context of the previously mentioned base station (e.g., 3GPP eNB or gNB), wireless access points using unlicensed or quasi-licensed spectrum associated with e.g., a managed network (e.g., hybrid fiber coax (HFC) cable architecture having a multiple systems operator (MSO), digital networking capability, IP delivery capability, and a plurality of client devices), or a mobile network operator (MNO), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., indoors, outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, Internet Protocol DARPA Internet Program Protocol Specification, IETF RCF 791 (September 1981) and Deering et al., Internet Protocol, Version 6 (IPv6) Specification, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitation DSA, LSA, or TVWS systems, and those above 4.0 GHz (e.g., currently proposed allocations up to 4.2 GHz, and even millimeter wave bands such as those between 24 and 100 GHz).

Moreover, while some aspects of the present disclosure are described in detail with respect to so-called "4G/4.5G" 3GPP Standards (aka LTE/LTE-A) and so-called 5G "New Radio" (3GPP Release 15 and TS 38.XXX Series Standards and beyond), such aspects—including allocation/use/withdrawal of CBRS spectrum—are generally access technology "agnostic" and hence may be used across different access technologies, and can be applied to, inter alia, any type of P2MP (point-to-multipoint) or MP2P (multipoint-to-point) technology, including e.g., Qualcomm Multefire.

It will also be appreciated that while the primary embodiments of the methods and apparatus described herein are cast in terms of enhancing throughput of base station which supports lower modulation order than the DOCSIS data network, the various aspects of the disclosure may find utility in other types of applications.

Other features and advantages of the present disclosure will immediately be recognized by persons of ordinary skill in the art with reference to the attached drawings and detailed description of exemplary embodiments as given below.

Methodology—

Various methods and embodiments thereof for enhancing communication and throughput of a wireless device backhauled by a DOCSIS network according to the present disclosure are now described with respect to FIGS. 3-5C.

Figure 2:
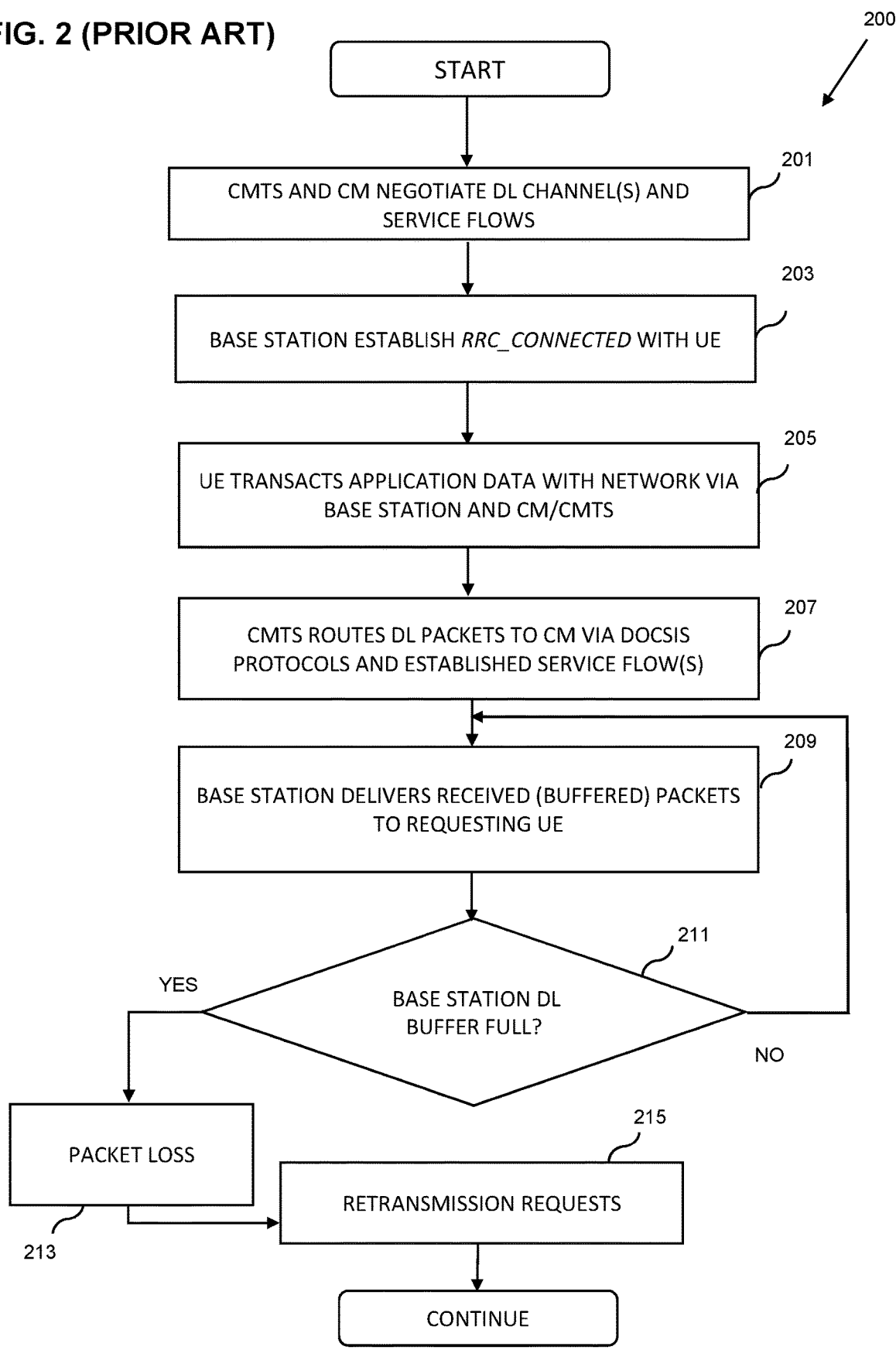
FIG. 2 is a logical flow diagram illustrating a typical prior art data backhaul scenario for a wireless base station (e.g., CBSD) backhauled via the DOCSIS infrastructure of FIG. 1A.

However, before discussing these embodiments, it is illustrative to review in detail the operation of extant DOCSIS systems while servicing a wireless device via a base station backhauled thereby. Referring now to FIG. 2, a prior art sequence 200 for wireless device service provision is conceptually shown. At step 201, the CMTS and CM negotiate channel configuration and service flows, such as for a DL bearer and service flow as set forth in the exemplary DOCSIS protocols incorporated by reference elsewhere herein.

Per step 203, the user device (e.g., a 3GPP UE such as a mobile device of FWA) implements so-called "RACH" (random access channel) procedures to synchronize with the base station (e.g., gNB or eNB, hereinafter "xNB"). Pursuant thereto, the UE also subsequently connects to the xNB to establish a radio resource layer connected state (i.e., RRC_Connected) via UL and DL shared channels and associated procedures. RACH and RRC procedures are well known, and not described further herein.

At step 205, the UE transacts its application data over the CBSD, CM and CMTS backhaul with e.g., a distant networked server process, utilizing e.g., 3GPP packet data network (PDN) infrastructure. As part of such transaction, application layer or user-plane (UP) data is transacted back and forth, such as for delivery of streaming media to the connected UE. As such, the CMTS routes DL data packets destined for the UE application to the CBSD via the CM using the established service flows per step 207. Depending on the version of DOCSIS and other parameters as implemented, the DL may utilize for instance 1024-QAM, which significantly exceeds the maximum modulation order of 256-QAM for a 3GPP LTE DL to the UE.

Per step 209, the CBSD delivers the received UP data to the UE via the air interface, which are buffered within the CBSD as they are received. As previously described, given the modulation order mismatch, the buffer(s) on the CBSD may rapidly fill and even overflow (step 211), which may result in undesired packet loss 213 and subsequent retransmission requests to the sending server (step 215), which is undesirable from each of a user experience and network congestion perspective. Note that while FIG. 2 shows a conceptual evaluation of buffer level, no such buffer evaluation or management logic exists within such prior art solutions (other than perhaps those associated with higher layer protocols), and no base station communication and control functionality is present.

It will be appreciated that FIG. 2 is somewhat of a simplified representation of the actual operations and steps; for instance, data is transacted multiple times between UE and xNB during RACH and connection, and between the xNB and the core during attachment, as well as for negotiation with the network server, etc.

Figure 3:
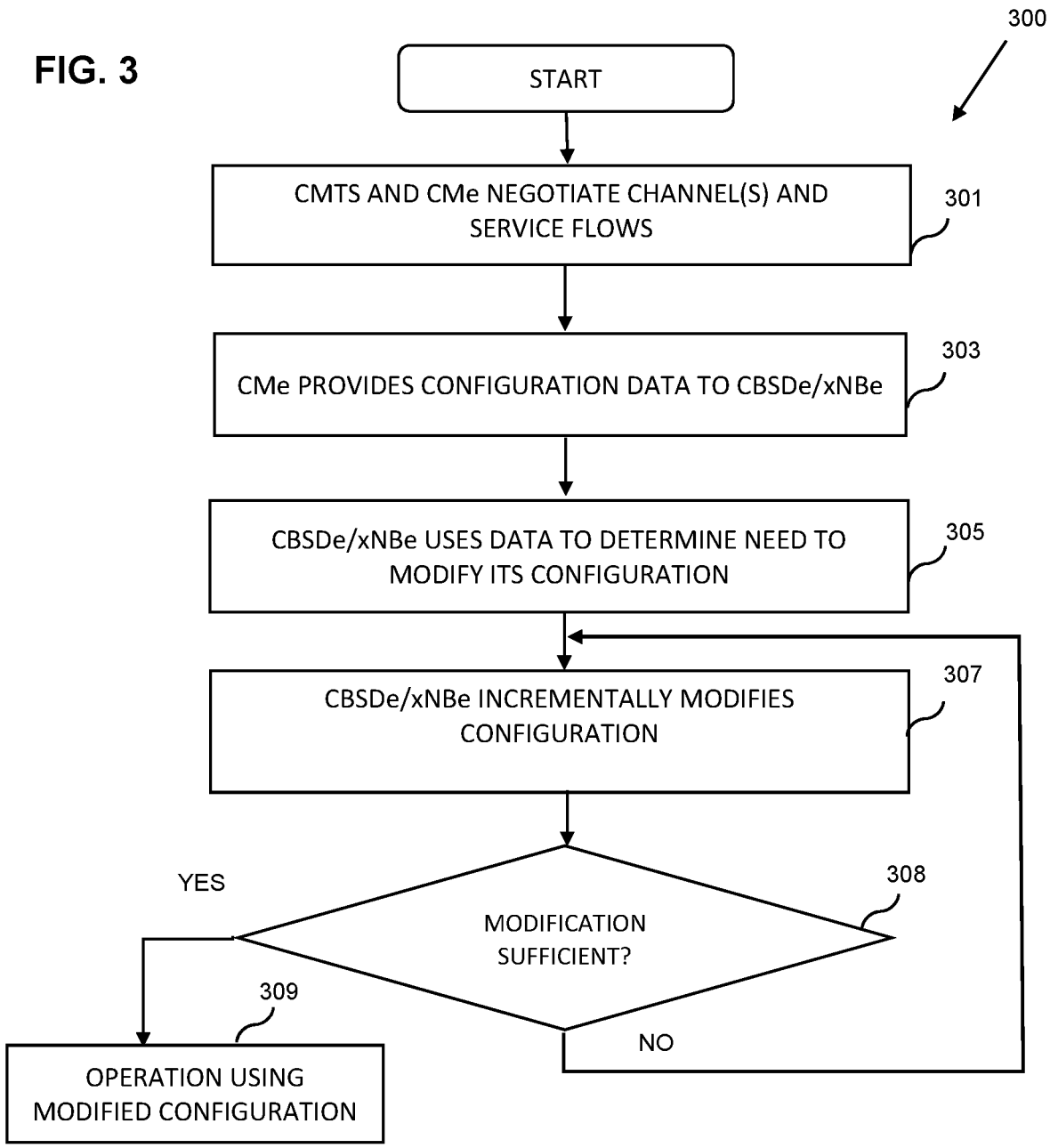
FIG. 3 is a logical flow diagram illustrating one embodiment of a method for data processing via an enhanced wireless base station (e.g., CBSD) backhauled via the improved DOCSIS infrastructure of the present disclosure.

With the foregoing as a backdrop, the exemplary methods of providing enhanced communication and throughput according to the present disclosure are now described with respect to FIG. 3.

At step 301 of the method 300, the CMTSe 603 and CMe 631 (see FIG. 6) negotiate channel configuration and service flows, such as for a DL bearer and service flow as set forth in the exemplary DOCSIS protocols incorporated by reference elsewhere herein. As described subsequently herein, such negotiation may also include the CMTSe establishing one or more designated/dedicated "base station" service flows for transacting data destined for, or transmitted by, the CBSDe.

Per step 303, the CMe provides DL bearer configuration data to the CBSDe/xNBe 631. This configuration data may include e.g., modulation order (e.g., 512-QAM, 1024-QAM, etc.), FEC type (e.g., LDPC or Turbo code, over-coding rate, etc.), and/or other parameters which assist the logic of the CBSDe in evaluating the need to change its wireless (air interface) link parameters so as to effect "rate matching." As used in the present context, the term "rate matching" refers generally and without limitation to processes which seek to adjust or align data throughputs between the backhaul and the downstream CBSDe and UE, such that one or more desired buffer or other criteria are met. As such, a rate-match in no way connotes that the rates must exactly match or even be close; rather the term is to be more broadly construed to simply reflect a desired relationship between two (or more) data flows.

As a brief aside, an advantage of QAM over other modulation types includes the ability to achieve high data rate, as a greater number of bits are carried by one carrier. Conversely, although data rate has been increased by mapping more than 1 bit onto a single carrier, QAM generally requires comparatively high SNR in order to support proper decode the bits at the receiver. Moreover, high linearity power amplifiers in the transmitter are required, and robust forward error correction is needed as well. In balance, QAM is a widely deployed modulation type (including on wireline and wireless interfaces as previously described), and hence it is quite reasonable that a "differential QAM" condition may exist between the backhaul and air interface, especially since the former is generally less exposed/susceptible to noise and interference which reduce SNR than the latter. These differences may also vary a s a function of time and other factors (e.g., other nearby CBSDe devices operating at or near the served premises), and hence the present disclosure contemplates dynamically varying implementation of the methodologies described herein.

Per step 305, the CBSDe uses the received configuration data to determine a need to modify its air interface configuration. For instance, as described in greater detail below, in some embodiments, the CBSDe will perform a simple modulation order comparison; if the CMTSe/CMe modulation order on the DL exceeds that of the current (or maximum) air interface modulation order, then a configuration change is needed. In more sophisticated embodiments, a more detailed evaluation, including on actual or estimated effective data throughput (which may be affected by factors other than only modulation order) may be utilized. Factors which may be considered in such analyses may include the actual PER/BER experienced on one or more of the links, HARQ/ARQ statistics, on the wireless interface, channel estimation data for the wireless or wireline interfaces, iPerf data (i.e., form an indigenous iPerf process executing on one or more of the devices), and other data.

Per step 307, the CBSDe/xNB implements an incremental modification regime to attempt to address any identified deficiencies/need for changes, such as where modifications to the air interface or other aspects of CBSDe/UE operation are modified in a step-wise fashion, as described in detail below.

At step 308, the effect of the modification is evaluated (e.g., after a prescribed period of time), and if satisfactory, operation is continued using the modified configuration per step 309. If not, further incremental configuration changes are employed.

Figure 4:
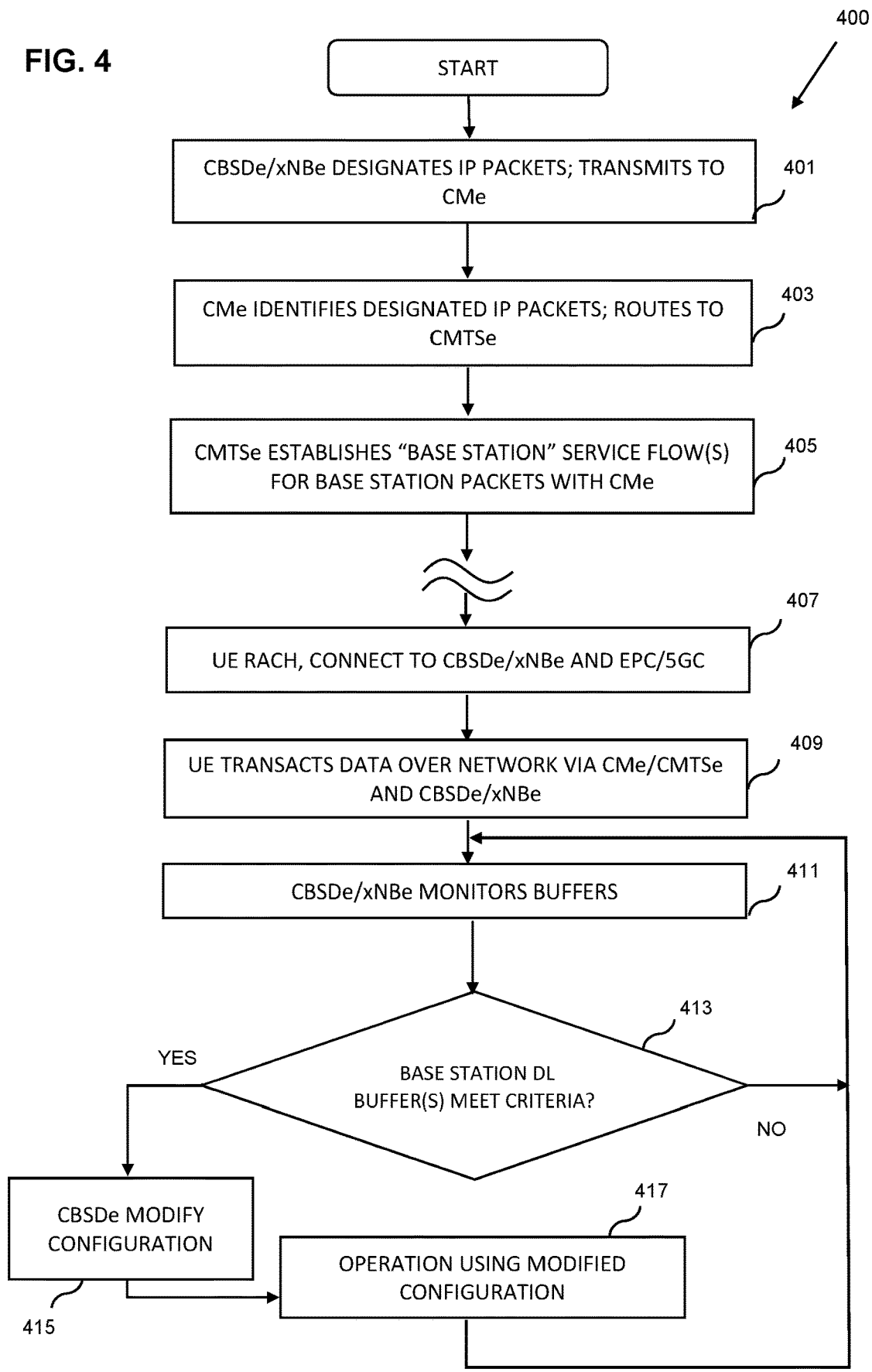
FIG. 4 is a logical flow diagram illustrating one embodiment of a method for UE connection and DL packet processing via the improved DOCSIS infrastructure of the present disclosure.

FIG. 4 is a logical flow diagram illustrating one embodiment of a method for UE connection and DL packet processing via the improved DOCSIS infrastructure of the present disclosure.

As shown in FIG. 4, the method 400 includes the CBSDe/xNBe designating its packets (e.g., IP packets) with a designator indicative of their origin—see discussion of FIG. 9 below. These packets are transmitted to the upstream CMe via e.g., the wireline interface between the two devices.

Per step 403, the CMe identifies the designated packets and routes them to the CMTSe (e.g., a particular prot or socket thereof, or other target destination) which allows the CMTSe to determine that a base station is attached to the CMe.

Responsive thereto, per step 405, the CMTSe (optionally) establishes one or more base station-specific service flows.

At some later time, a UE implements RACH/authentication/connection procedures with the EPC/5GC via the CBSDe and backhaul (step 407), and then transacts application layer or UP data with e.g., a network server. Data is received as part of such transaction, and buffered at the CBSDe after delivery by the CMTSe/CMe (step 411).

At step 413, one or more criteria are monitored (e.g., DL buffer instantaneous fill level or fill rate, average fill level/rate, packet delay, or other), and if the "overflow" or "high water mark" thresholds are reached, the CBSDe/xNBe modifies the air interface per step 415, and continues operation for a period of time under the new configuration. If the overflow criteria are not met as part of step 413, no configuration change is implemented, and operation using the unmodified configuration (and monitoring) continues.

Figure 5:
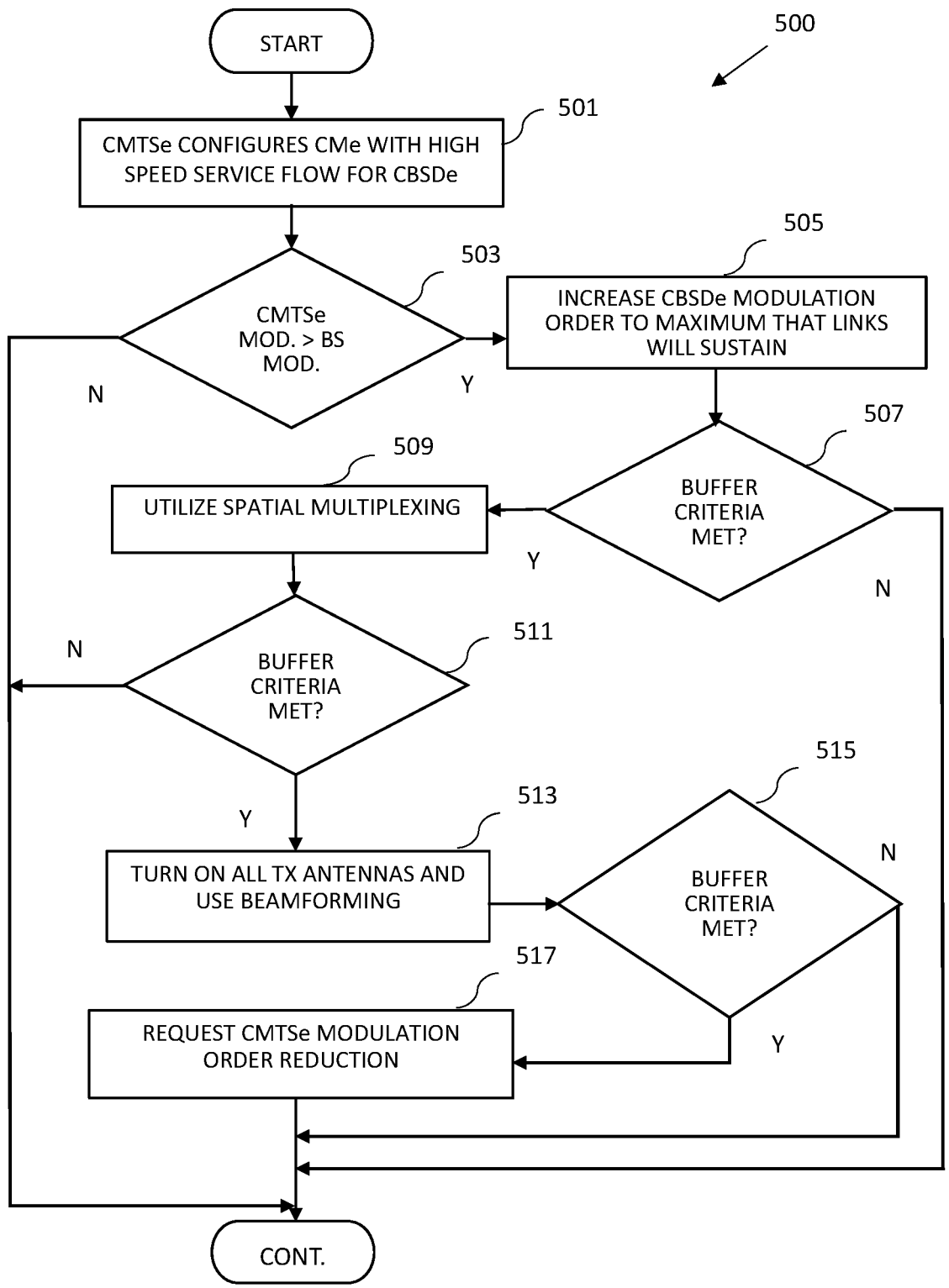
FIG. 5 is a logical flow diagram illustrating one implementation of portions of the method of FIG. 4.

FIG. 5 is a logical flow diagram illustrating one implementation of portions of the method of FIG. 4. In this implementation, the method 500 includes the CMSTe first configuring the CMe with one or more service flows dedicated to the CBSDe, as previously described (step 501).

Per step 503, the CBSDe (or CMe, when equipped appropriately including ability to receive data from the CBSDe regarding the configuration of the latter) evaluates the relationship between modulation order of the DL service flow and that used by the CBSDe for its air interface. If there is a mismatch, the CBSDe increases its modulation order per step 505, such as to the maximum that the link will sustain (which may be less than the 256-QAM LTE or 1024-QAM 5G NR limits). This determination is made indigenously by the logic of the CBSDe and UE utilizing e.g., 3GPP protocols, which are not discussed further herein.

At step 507, the target buffer(s) is/are evaluated, and per step 509, spatial multiplexing is invoked when the buffer criteria is met (e.g. buffer fill/rate, etc.). As a brief aside, in spatial multiplexing mode, each antenna transmits independent and separately encoded data signals known as streams between the transmitting and receiving antennas. Hence, depending on the received modulation order, the CBSDe/xNBe may use spatial multiplexing mode to increase its throughput by sending data over multiple independent streams. This is to be contrasted with spatial diversity, which generally involves transmission of the same data stream over more antenna to e.g., enhance coverage.

In one implementation, the CBSDe or a designated proxy therefor computes wireless channel capacity (expected throughput) for different spatial multiplexing modes. The spatial multiplexing channel capacity is computed in one approach as:

$$C_{SP} = B\log_2 \det\left[1 + \frac{P}{M}H\sum H^*\right] \qquad \text{Eqn. (1)}$$

where $\Sigma$ is the covariance of the output streams which depends on modulation order is defined as $$S = \begin{bmatrix} s_1 & 0 & & 0 \\ 0 & s_2 & \cdots & \vdots \\ \vdots & \vdots & \vdots & \vdots \\ 0 & 0 & \cdots & s_K \end{bmatrix} \qquad \text{Eqn.(2)}$$

and B is the transmission bandwidth, P is the total transmit power at the CBSDe/xNBe, H is the MIMO channel, $\Sigma$ is the covariance of output data stream which depends on modulation order. I is an identity matrix, and M is the number of transmit antennas. H* and det denote the complex conjugate and determinant respectively. The MIMO channel H can be estimated from training data in UL transmission, or estimated in DL from training data and sent to CBSD/xNB.

It will also be appreciated that step 507 may be implemented on a per-buffer (i.e., differentiated buffer) basis. For instance, in one implementation of the methods and apparatus of the present disclosure, the CBSDe is configured to maintain a plurality of DL and UL buffers (which need not necessarily by symmetric with one another), such as on a per-UE basis. It may be, for instance, that an application process executing on one connected UE is consuming large amounts of DL bandwidth, and hence its dedicated DL buffer(s) may fill rapidly as compared to other connected UE. As such, the present disclosure contemplates both per-UE (or per-SF) monitoring and evaluation of buffers, and per-UE implementation of configuration changes to address buffer overflow or other such issues, including for spatial multiplexing and beamforming (as described below).

As a brief aside, for DOCSIS 3.0, downstream channels employ a downstream scheduler process operative at the CMTS that manages the allocation of bandwidth across multiple 6 MHz wide channels among competing service flows (a transport service that provides unidirectional transport of packets). A DS service flow may consist for example of one or more TCP/IP connections terminating at a specific CM, and service flow traffic may be prioritized based on QoS traffic parameters associated with the flow. However, the DOCSIS 3.0 standard does not specify how a specific scheduling implementation should differentially treat data having different priority levels.

Under DOCSIS 3.0, the upstream channel is time division (TDM) multiplexed (or SC-FDMA), and the TDM mode uses transmission slots referred to as mini-slots. Permission to transmit data in a block of one or more mini-slots must be granted by a CMTS to each CM. The CMTS grants mini-slot ownership by periodically transmitting MAP frames on the downstream channel. The MAP also typically identifies some mini-slots as contention slots; for these contention slots, the CMs may bid for quantities of future resources. To minimize collisions for the contention slots, a backoff procedure is employed. Additionally, in the event that a CM has a backlog of upstream packets, it may also "piggyback" a request for mini-slots for the next packet at the end of the then-current packet.

In contrast to DOCIS 3.0, DOCSIS 3.1 DS channel bandwidth is between 24 and 192 MHz, and between 6.4 and 96 MHz in the US. The DOCSIS 3.1 physical layer uses wideband orthogonal frequency division multiplexing (OFDM) channels (downstream) and orthogonal frequency division multiple access (OFDMA) channels (upstream). Due to the use of many subcarriers in an upstream channel, multiple CMs on the same upstream channel can send data packets to the CMTS simultaneously on different subcarriers. This approach enables a very large data bandwidth through the use of only a single channel. Additionally, at the MAC layer, DOCSIS 3.1 continues to support channel bonding. This feature now allows the bonding of OFDM/OFDMA, as well as mixed bonding of legacy single-carrier channels and the OFDM/OFDMA channels (i.e., effectively treating an OFDM/OFDMA channel as a single-carrier channel). DOCSIS 3.1 also requires AQM (Active Queue Management) to reduce the buffering latency in CM and CMTS.

In addition to the "best efforts" service previously described, other services may be used for traffic service flow management (depending on the version of DOCSIS). For example, Non-real-time polling service (NRTPS) can be used for upstream service flows. In this service, the CMTS scheduler sends unicast polls to individual CMs on a fixed interval, in order to determine whether data is queued for transmission on a particular service flow. If so, the CMTS scheduler provides a transmission grant for the service flow. Associated QoS parameters for NRTPS may include Traffic priority, Request Transmission Policy, Maximum Sustained Traffic Rate, Maximum Traffic Burst, Minimum Reserved Traffic Rate, Assumed Minimum Reserved-Traffic-Rate Packet Size, and Nominal Polling Interval.

Additionally, the Real-time polling service (RTPS) may be used for upstream service flows. RTPS is generally analogous to NRTPS, except that the fixed polling interval is contracted. In RTPS, request opportunities that meet the service flows' real-time needs can be selected, and the cable modem may specify the size of the desired grant. QoS parameters for RTPS may include Request Transmission Policy, Maximum Sustained Traffic Rate, Maximum Traffic Burst, Minimum Reserved Traffic Rate, Assumed Minimum Reserved-Traffic-Rate Packet Size, Nominal Polling Interval, and Tolerated Poll Jitter.

Under the Unsolicited grant service (UGS), upstream service flows receive a fixed-size grant at fixed intervals without additional polling or interaction. Thus, UGS eliminates much of the overhead associated with the polling flow types described above. QoS parameters may include Request Transmission Policy, Unsolicited Grant Size, Grants per Interval, Nominal Grant Interval, and Tolerated Grant Jitter.

Unsolicited grant service with activity detection (UGS-AD) is hybrid of the UGS and RTPS scheduling types. When there is activity, the CMTS sends unsolicited fixed grants at fixed intervals to the CM(s). Conversely, when there is no activity, the CMTS sends unicast poll requests to the CM(s) so as to conserve bandwidth. QoS parameters for UGS-AD may include Request Transmission Policy, Nominal Polling Interval, Tolerated Poll Jitter, Unsolicited Grant Size, Grants per Interval, Nominal Grant Interval, and Tolerated Grant Jitter.

For downstream service flows, a similar set of QoS parameters that are associated with the best-effort scheduling type on upstream service flows is utilized. QoS parameters for the DS SFs may include Traffic Priority, Maximum Sustained Traffic Rate, Maximum Traffic Burst, Minimum Reserved Traffic Rate, Assumed Minimum Reserved-Traffic-Rate Packet Size, and Maximum Latency.

Hence, the foregoing mechanisms may be selectively manipulated as needed (e.g., by the rate matcher logic or a proxy therefore in the CMTSe) in order to achieve a desired level or characteristic of performance for e.g., DS traffic, including that queued on a per-UE basis, including by (i) selection of appropriate QoS or other parameters as listed above, and/or (ii) selectively turning on/off (or using not/using) such features at all.

It will also be appreciated that packets queued in certain prescribed service flows and/or buffers (e.g., UE-specific buffers) may be selectively made subject to (or not subject to) management features such as request/grant procedures, packet "drop" protocols such as may be utilized with e.g., DOCSIS AQM (Active Queue Management) or the PIE algorithms (RFC 8034), or other such mechanisms. As a brief aside, in e.g., DOCSIS 3.1 contexts (and even some DOCSIS 3.0 installations which have been retrofitted), so-called Active Queue Management (AQM) may be applied in order to facilitate upstream packet queue management. At a high level, during AQM, the CM and CMTS monitor how full their buffers are getting, and as soon as they detect that the TCP (transport control protocol, the transport layer protocol used in conjunction with IP) is keeping the buffer full (or over-full), packets are selectively dropped in order to signal TCP that it needs to reduce flow (i.e., so that lower buffer levels can be maintained). One implementation of AQM is detailed in RFC 8034 (including the so-called "PIE" (proportional integral enhanced active queue management) algorithms, the foregoing incorporated herein by reference in its entirety. Other such mechanisms may be applied to the DL as well. Hence, in totality, extant DOCSIS protocols may, depending on configuration and functionality selected, significantly (and unacceptably) delay or even completely drop packets, and such features can be selectively bypassed for e.g., individual per-UE buffering, including in the DS direction, so as to achieve desired performance with respect to the aforementioned "rate matching" functionality.

Returning again to FIG. 5, per step 511, the buffer criteria are again assessed (e.g., after a period of time operating within an SM mode), and if the criteria are again met—indicating that the SM mode has not effectively mitigated the buffer condition—beamforming is then invoked. In beamforming mode, multiple antennas are used to form targeted beams, increasing Signal-to-Noise-Plus-Interference (SINR), and thereby the throughput. In beamforming, multiple input streams are precoded to multiple higher or equal number of streams, and the precoded signals are transmitted over multiple antennas. The CBSDe/xNBe may calculate the precoding matrix dynamically or use predefined codebook stored in its memory.

In one approach, the beamforming channel capacity is computed as:

$$C_{BM} = B\log_2 \det\left[1 + \frac{P}{M}HRH^*\right] \quad \text{Eqn.(3)}$$

where:

$$R = E[F\Sigma F^*] \quad \text{Eqn. (4)}$$

F k×M is the beamforming weight matrix that transforms k independent streams to M stream to be transmitted on M antennas, and $\Sigma$ is a diagonal matrix representing the independent stream powers. F is defined as:

$$F = \begin{bmatrix} f_{11} & f_{12} & & f_{1k} \\ f_{21} & f_{22} & \cdots & \vdots \\ \vdots & \vdots & \vdots & \vdots \\ f_{M1} & f_{M2} & \cdots & f_{MK} \end{bmatrix} \quad \text{Eqn.(5)}$$

As referenced above, beamforming in the exemplary embodiment is conducted on a per-UE (or other differentiated buffer) basis, and hence the beamforming is in one approach applied to one or more individual UE for a prescribed period of time or other metric, the UE having met associated buffer criteria.

In some variants, the method logic is configured such that if spatial multiplexing channel capacity as defined above in Eqns. (1)-(3) is greater or less than beamforming channel capacity as defined above in Eqns. (4)-(5), the method selectively employs one or the other initially to transmit data to the end user clients. It may be that in certain scenarios, one approach may produce better/faster results than another, and as such may be selectively invoked first.

Figure 5A:
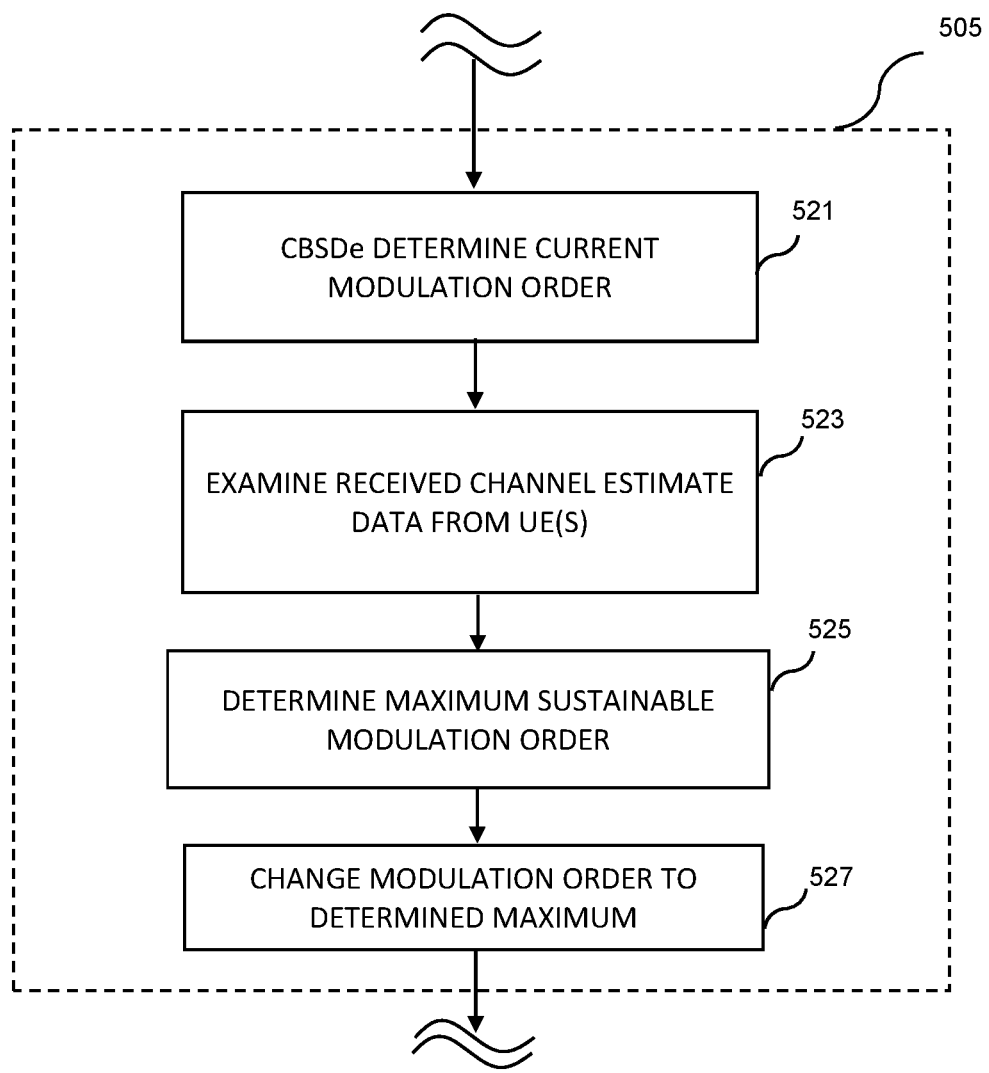
FIG. 5A is a logical flow diagram illustrating one implementation of the modulation order modification process of FIG. 5.

FIG. 5A is a logical flow diagram illustrating one implementation of the modulation order modification process of FIG. 5. As shown, step 505 of the method 500 is implemented by first determining (at e.g., the CBSDe) the current modulation order it is using for the applicable air interface (s), such as by examination of the then-current MCS data.

Next, per step 523, received channel estimate (CE) data from the attached UE is evaluated to evaluate the channel condition. Based thereon, per step 525, the maximum modulation order/MCS that can be sustained is selected. For instance, a pre-coded data structure or matrix relating certain channel conditions to certain MCS/modulation order values may be used by the CBSDe in making this selection.

Lastly, per step 527, the selected configuration is implemented, such as via signaling between the affected UE and the CBSDe using 3GPP protocols.

Figure 5B:
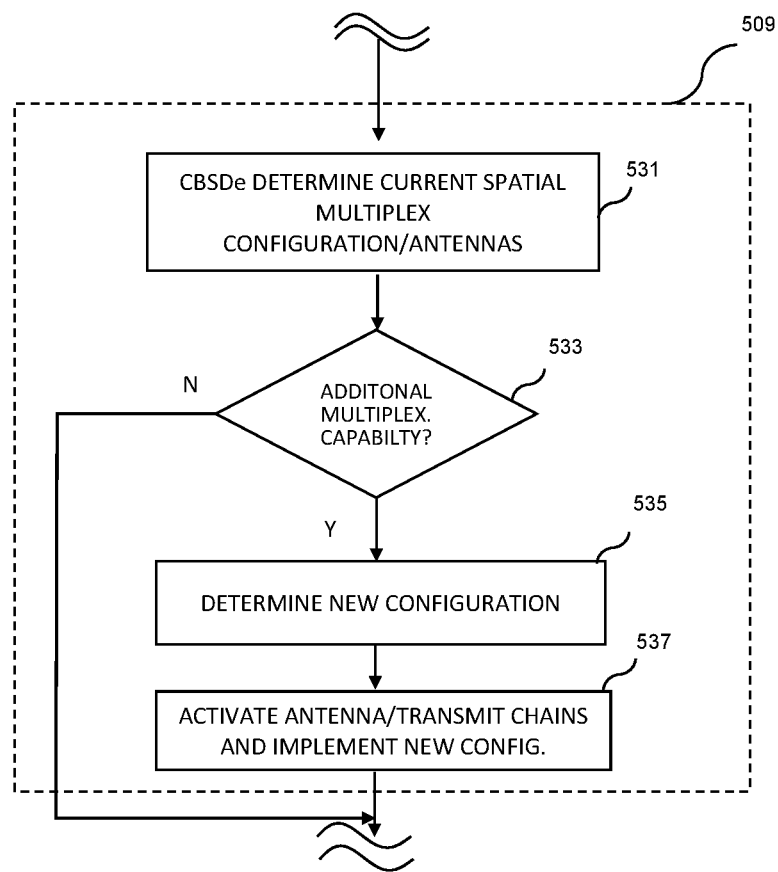
FIG. 5B is a logical flow diagram illustrating one implementation of the spatial multiplexing configuration process of FIG. 5.

FIG. 5B is a logical flow diagram illustrating one implementation of the spatial multiplexing configuration process of FIG. 5. In this implementation, step 509 is implemented by first determining at e.g., the CBSDe the current spatial multiplexing configuration, which may include determination of the number of transmit chains and antenna elements currently in use. For instance, the CBSDe may be communicating with a given UE using a single antenna/transmit chain (see FIG. 7A)—a "1×1" configuration.

Per step 533, the CBSDe next determines whether additional SM capacity is available, such as where in the foregoing example the CBSDe has 2 or 4 or even more antennas and radio chain infrastructure that can support higher order spatial multiplexing (e.g., 2×, 4×, etc.). This can be determined by e.g., reading configuration data of the CBSDe stored in its memory or other mass storage.

Per step 535, the new SM configuration is determined based on the results of step 533. This may in one approach cause the CBSDe to immediately jump to the maximum available SM configuration, or in other approaches result in a more incremental progression through two or more high SM modes.

Lastly, at step 537, the selected configuration is implemented, and any necessary antennae/transceiver chains not currently operating are activated at least for the DL.

Figure 5C:
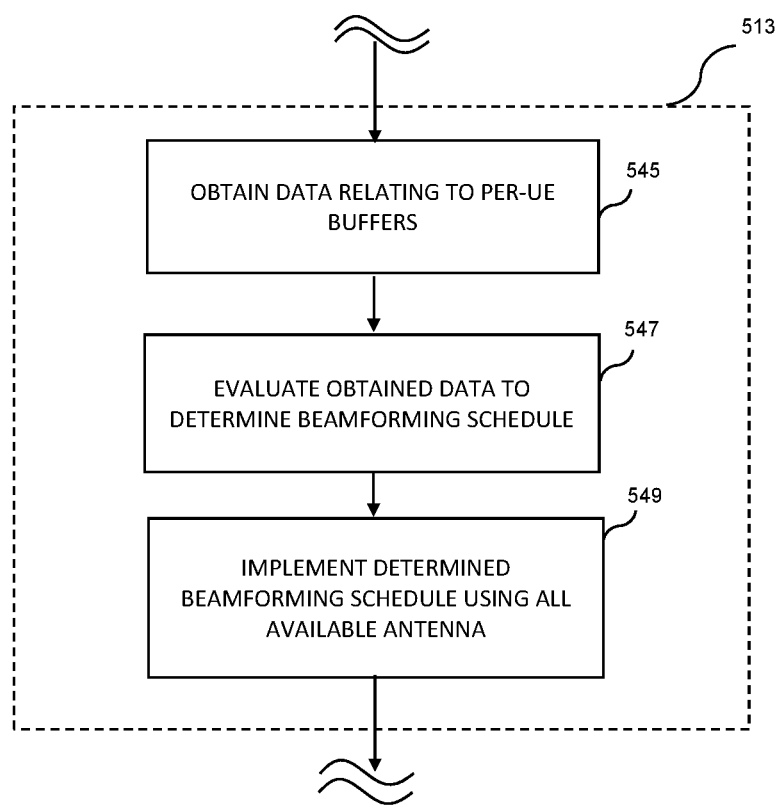
FIG. 5C is a logical flow diagram illustrating one implementation of the beamforming configuration process of FIG. 5.

FIG. 5C is a logical flow diagram illustrating one implementation of the beamforming configuration process of FIG. 5. As shown, step 513 of the method 500 is implemented here by first obtaining data relating to one or more target buffers (e.g., on a per-UE, per-direction (i.e., UL or DL) basis) at step 545.

Next, per step 547, the CBSDe evaluates the obtained data to determine a beamforming "schedule." For instance, in one approach, the beamforming applied to a given UE associated with an overfilling DL buffer is applied for a period of time. This period of time may be determined by e.g., estimating throughput capacity under beamforming in the available antenna/transmitter configuration, and calculating how much time is required to work down the overfilling buffer to a sufficient level (which may be different than any trigger criteria or threshold for invocation, as previously described). In that multiple UE and/or individual buffers may require "draining", the CBSDe can calculate the requisite time for each different UE/buffer, and construct the aforementioned schedule accordingly. Note that such beamforming may need to be applied only once, such as in the case of transient loads, or repetitively such as in the case of recurring high load conditions.

Lastly, per step 549, the determined beamforming schedule is implemented, such as via use of all available antennae elements and transmit chains. Subset thereof may be used as well, including allocation of some assets to different UE effectively contemporaneously ("split" schedule).

It is noted that the foregoing logic of FIGS. 3-5C may be modified in a number of ways, depending on the particular application and desired functionality. For instance, in one variant, the CBSD/xNB may turn on only a subset of antennas to save power consumption or reduce interference with another CBSDe, instead of turning on all of the antennas.

In another variant if the propagation characteristic of the end user devices (e.g., antenna correlation, angle of arrival) is available at the CBSDe/xNBe (such as for FWA UE), and the CBSDe/xNBe can use that information in computing the beamforming matrix or use selective diversity techniques that use only of subset of transmit and receive antennas.

It will further be appreciated by those of ordinary skill given this disclosure that the foregoing methods are readily adapted to UL data transmission as well as DL transmission. For example, in some instances, the UL capacity of the wireline backhaul may be less than that of the air interface between the CBSDe and a UE, such that one or both of (i) CBSDe UL buffers, and/or (ii) CMe receive buffers, may fill undesirably. While generally not the case, some instances of very low UL capacity such as due to CMe or CMTSe impairment, etc. may cause selection of a modulation order on the uplink which is less than e.g., 256-QAM (LTE) or 1024-QAM (NR), as one example. Under such scenarios, the CBSDe logic (described in greater detail below) may implement some corrective actions, such as requesting the CMTSe (via the CMe) to increase its upstream service flow configuration (or instantiate one or more new flows), and/or throttling of the air interface on its downstream side such that UL communications from UE occur at a lesser data rate (e.g., transition from 256-QAM to 128-QAM for a period of time). Changes in wireline UL capacity negotiated between the CMSTe and CMe may also be communicated to the CBSDe via the methods described elsewhere herein (e.g., as protocol data packets over the wireline interface between the CMe and CBSDe), thereby enabling the CBSDe to adapt its configuration to changes occurring in the UL as well as DL, the two which may be configured very differently both with respect to the wireline interface and the wireless (air) interface.

Likewise, in cases where the DL configuration is reduced by the CMTSe (see discussion of FIG. 11B below), the CBSDe logic may adapt by utilizing data obtained from the CMe regarding such configuration change to reduce its air interface capability to the lowest configuration consistent with maintaining "rate matching", so as to conserve electrical power, reduce interference, or for other reasons.

It is also noted that in some scenarios, the utilization of additional/higher spatial multiplexing modes or beamforming modes may necessitate energization of different antennae, including those which may be "pointing" in different directions, such as to enhance throughput via e.g., offload of a UE to another sector. For instance, in the case of a sectorized antenna, each sector may have a different PCI (physical cell identifier) value, and may require permission for activation within prescribed power limits by e.g., a SAS (within the exemplary CBRS context). Hence, the methods and apparatus described herein contemplate use of an additional antenna elements or sectors having such separate PCI. In this case, the base station (CBSDe) may need to obtain a spectrum grant from a SAS or DP before such additional element or sector is energized.

Network Architectures—

Figure 6:
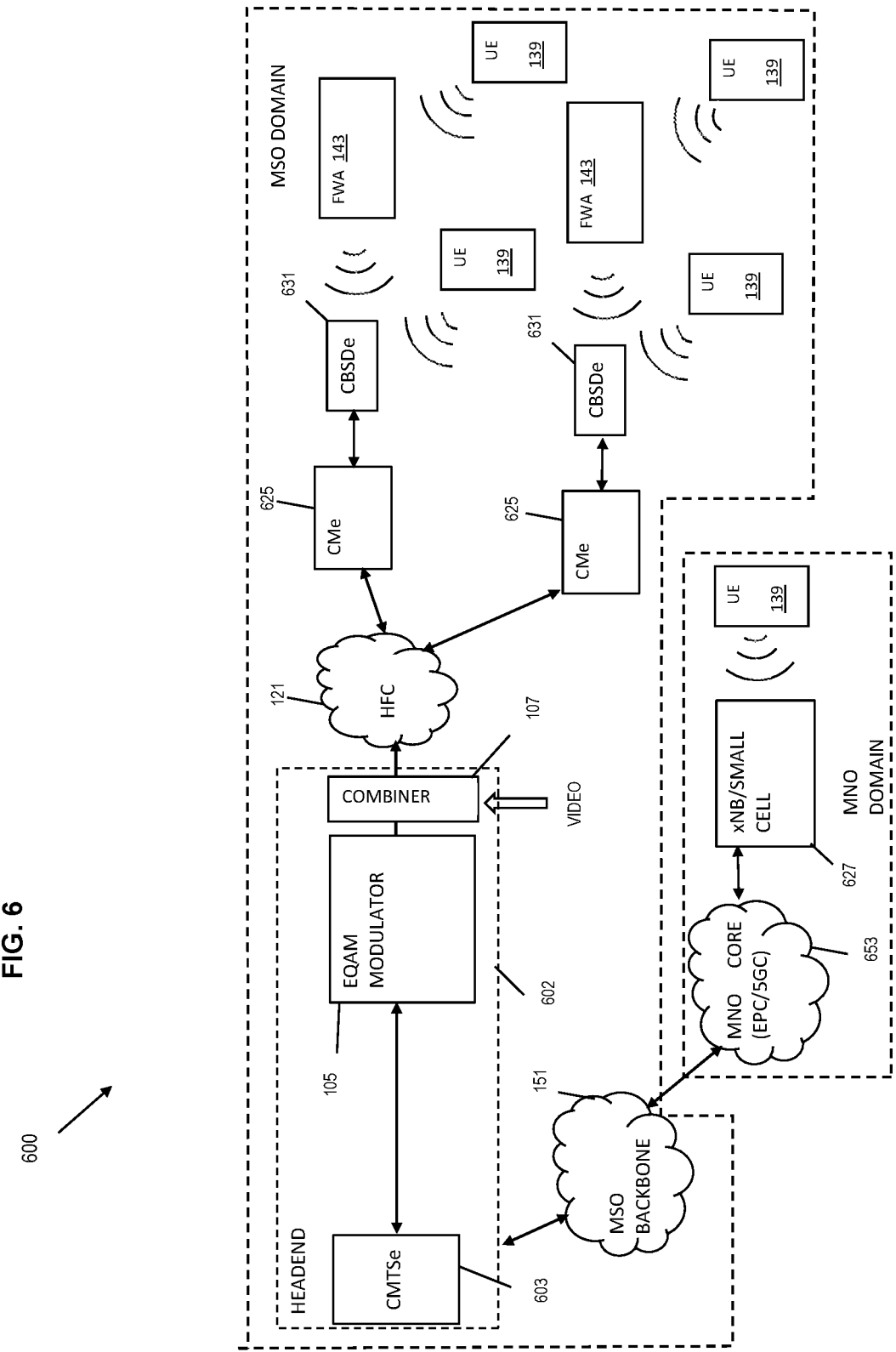
FIG. 6 is a block diagram illustrating one exemplary embodiment of network configuration with enhanced base station communication and throughput functionality according to the present disclosure.

FIG. 6 is a block diagram illustrating one exemplary embodiment of network configuration with enhanced base station communication and throughput functionality according to the present disclosure.

As a brief aside, the so-called modular headend architecture (MHA; see e.g. CableLabs Technical Report CM-TR-MHA-V02-081209, which is incorporated herein by reference in its entirety) essentially separates the downstream PHY layer out of the CMTS, and move it to a separate EQAM device. In this architecture, the CMTS transmits data to the EQAM via the Downstream External PHY Interface (DEPI). This architecture was introduced in order to reuse EQAM to modulate both the data bits as MPEG video bits. The upstream receiver is kept in the CMTS in the MHA.

In contrast, another architecture used in implementing headend platforms is the Converged Cable Access Platform (CCAP). In order to increase efficiency, the CCAP integrates the EQAM and CMTS into one platform. In addition, in the CCAP, all the downstream traffic, including DOCSIS and video QAMs are transmitted in a single port. The CCAP unifies the CMTS, switching, routing, and QAM modulator in one unit, so that all data and video are converted in IP packets before conversion to RF signals.

The Remote PHY technology, also known as Modular Headend Architecture Version 2 (MHAV2), removes the PHY from the CMTS/CCAP platform and places it in a separate access point that is interconnected with an IP network. One common location to place the remote PHY is the optical node that is located at the junction of the fiber and coax cable networks.

In the MHAV2 architecture, the CCAP includes two separate components, CCAP core and the Remote PHY Device (RPD). The CCAP core contains a CMTS core for DOCSIS, and an EQAM core for video. The CMTS core contains the DOCSIS MAC, upper layer DOCSIS protocols, all signaling functions, downstream and upstream scheduling. The EQAM core processes all the video processing. Similarly, an RMD (generally analogous to the RPD, but containing the DOCSIS MAC, also colloquially referred to as a "Flex MAC") is also specified; see e.g., CableLabs Technical Re4port CM-TR-R-MACPHY-V01-150730, which is incorporated herein by reference in its entirety.

The RPD/RMD processes all the PHY related function, such as downstream QAM modulators, upstream QAM demodulators, upstream coders, downstream decoders, filtering, time and frequency synchronization, as well as the logic to connect to the CCAP core. One motivation for using such approaches as RPD/RMD is the ability to obviate analog fiber components between the headend and optical nodes, and rather utilize digital optical PHY and interfaces thereby enhancing quality at the nodes.

Hence, it will be appreciated by one of ordinary skill given the present disclosure that the exemplary network architectures described below with respect to FIGS. 6 and 7 may be readily adapted to any of the foregoing models or paradigms (e.g., MHA, MHAv2, etc.), and yet other configurations are possible, those of FIGS. 6 and 7 being merely non-limiting examples.

Referring again to FIG. 6, a functional block diagram illustrating a first exemplary configuration of an HFC network architecture apparatus according to the present disclosure is shown, with enhanced CMTS (CMTSe) and EQAMs located at a cable system headend 602. This embodiment leverages existing architectures which utilize a headend-based CMTS and EQAM, yet with further expansion of CMTS capabilities. Specifically, as described in detail subsequently herein, the enhanced CMTSe 603 shown includes additional logic which supports base station service flow establishment and modulation scheme negotiation functions described herein. It will be appreciated that the various aspects of the disclosure may be implemented such that a CMTSe 603 is not required; i.e., a non-enhanced CMTS without base station service flow designation capability may be used, such as where a prioritized or dedicated service flow for the base station(s) served by the CMTS (and associated CMe) is not desired or required.

As shown, the architecture 600 of FIG. 6 includes the CMTSe 603, as well as switch logic that interfaces the CMTSe with one (or more) EQAMs 105. Output of the EQAMs is combined with video and other signals, and the combined (optical domain) signal transmitted downstream via optical fiber to one or more nodes within the HFC topology (not shown in FIG. 6) for ultimate delivery to CMe devices 625 for use by premises CPE (such as e.g., CBSDe devices 631, Wi-Fi-enabled routers, PCs, gateways, or other devices) within the served premises. UE 139 and FWA 143 may be served by the CBSDe devices at each premises as shown. For instance, in one model, the CBSDe 631 is disposed on a building rooftop, and mobile users can access the CBSDe via e.g., CBRS-band spectrum. In another model, the CBSDe is a high power (CAT. A) CBRS device which is used as a wireless backhaul for a number of FWA devices 143 (effectively fixed 3GPP UE that service e.g., residential premises). Many other models are possible.

In the embodiment of FIG. 6, the MSO domain is interfaced with an external MNO domain via the MSO backbone 151, such as where an MNO-operated EPC/5GC 653 which also services MNO cells (cellular xNBs) and small cells 627 is the cognizant core for the MSO domain users.

Figure 7:
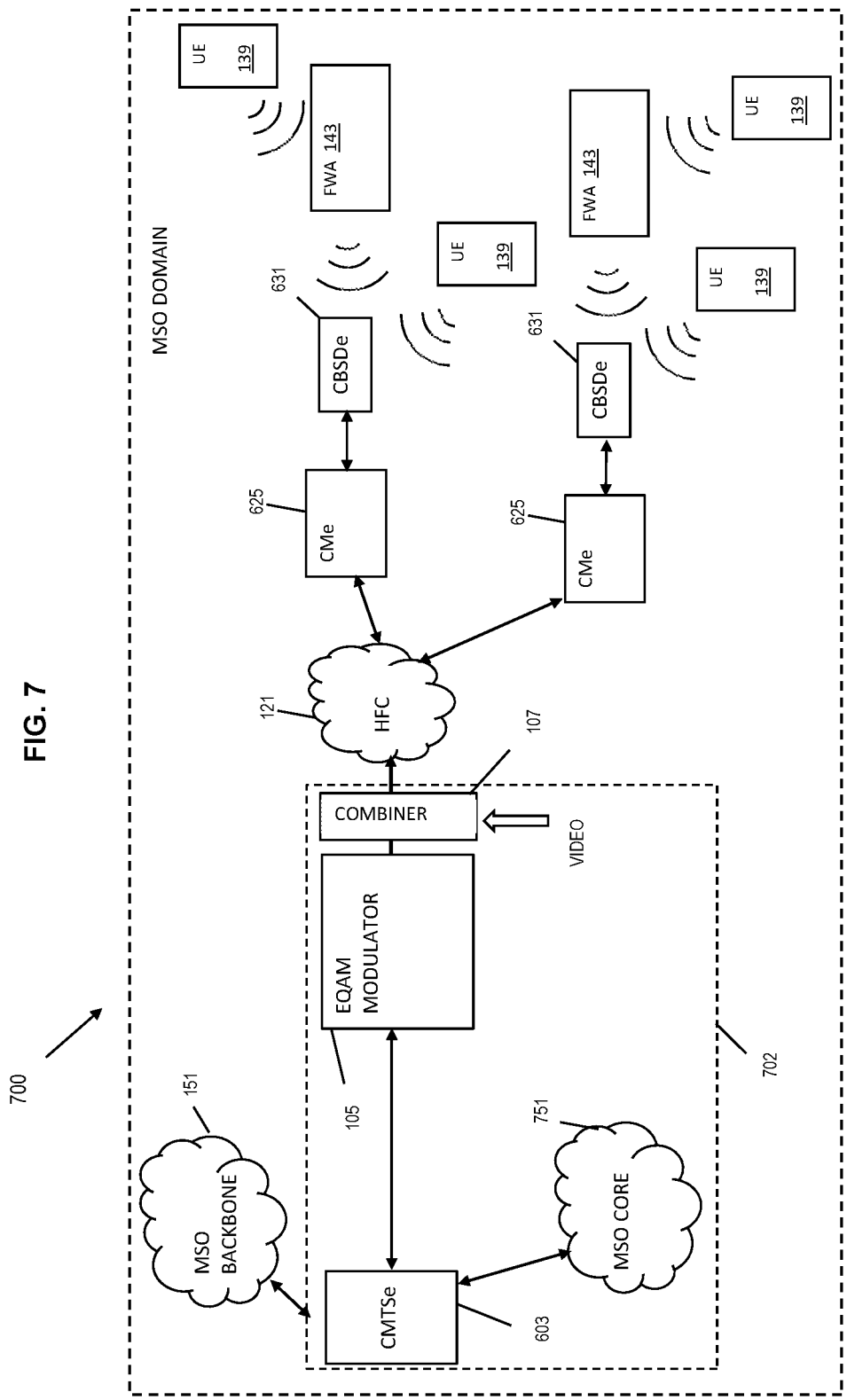
FIG. 7 is a block diagram illustrating another exemplary embodiment of network configuration with enhanced base station communication and throughput functionality according to the present disclosure.

FIG. 7 is a functional block diagram illustrating a second exemplary configuration of an HFC network architecture apparatus according to the present disclosure, with enhanced CMTS (CMTSe) 603 co-located (at least topologically) with an MSO-based core 751. In this model, the MSO domain contains all necessary components for e.g., UE attach procedures and packet session establishment, and any MNO based networks and their EPC/5GC infrastructure (not shown) are considered external. In that the UE's 139 are associated with MSO subscriber premises and subscriptions, and the core infrastructure is part of this "home" network, significant economies can be realized, as well as reduced latencies associated with network attachment and session management, since the MSO maintains control of all relevant processes (including timing delays which may otherwise be induced by external operator's equipment over which the MSO has no control).

In contrast, in the embodiment of FIG. 6 previously discussed, the architecture 600 is divided among two or more entities, such as an MNO and an MSO. As shown, the MSO service domain extends only to the CBSDe and served premises and the MSO core functions, while other functions such as 3GPP EPC/E-UTRAN or 5GC and NG-RAN functionality is provided by one or more MNO networks operated by MNOs with which the MSO has a service agreement.

In some embodiments, the architectures shown above may also include an MSO-managed and operated VoIP server which acts in effect as an equivalent of the 3GPP core for "cellular" calls; the server manages user/device authentication, call routing, etc. roughly analogous to the more sophisticated 3GPP procedures, and may likewise include timing and latency requirements, including for user plane data so as to avoid call "jerkiness" or temporal artifact during VoIP calls. It will be recognized that a 3GPP UE 139 might also have a VoIP stack operative thereon, such that the UE can utilize the VoIP server (not shown) via an established IP session (whether via a Wi-Fi connection to an AP which is backhauled by the CMe, or via a 3GPP NR-U or CBRS session conducted via the CBSDe). To this end, the present disclosure envisions that other types of access devices with stringent timing or other requirements may be configured similar to the CBSDe described in greater detail below. For instance, a WI-Fi 802.11ax ("6") AP may be enhanced with IP packet marking capability such that a VoIP call conducted using a user's PC or laptop with microphone and headset is "prioritized" in one manner or another, whether at the network/control plane or user data plane, by congested CMe/CMTSe, such as during an emergency 911 call.

CMTSe Apparatus

Figure 8:
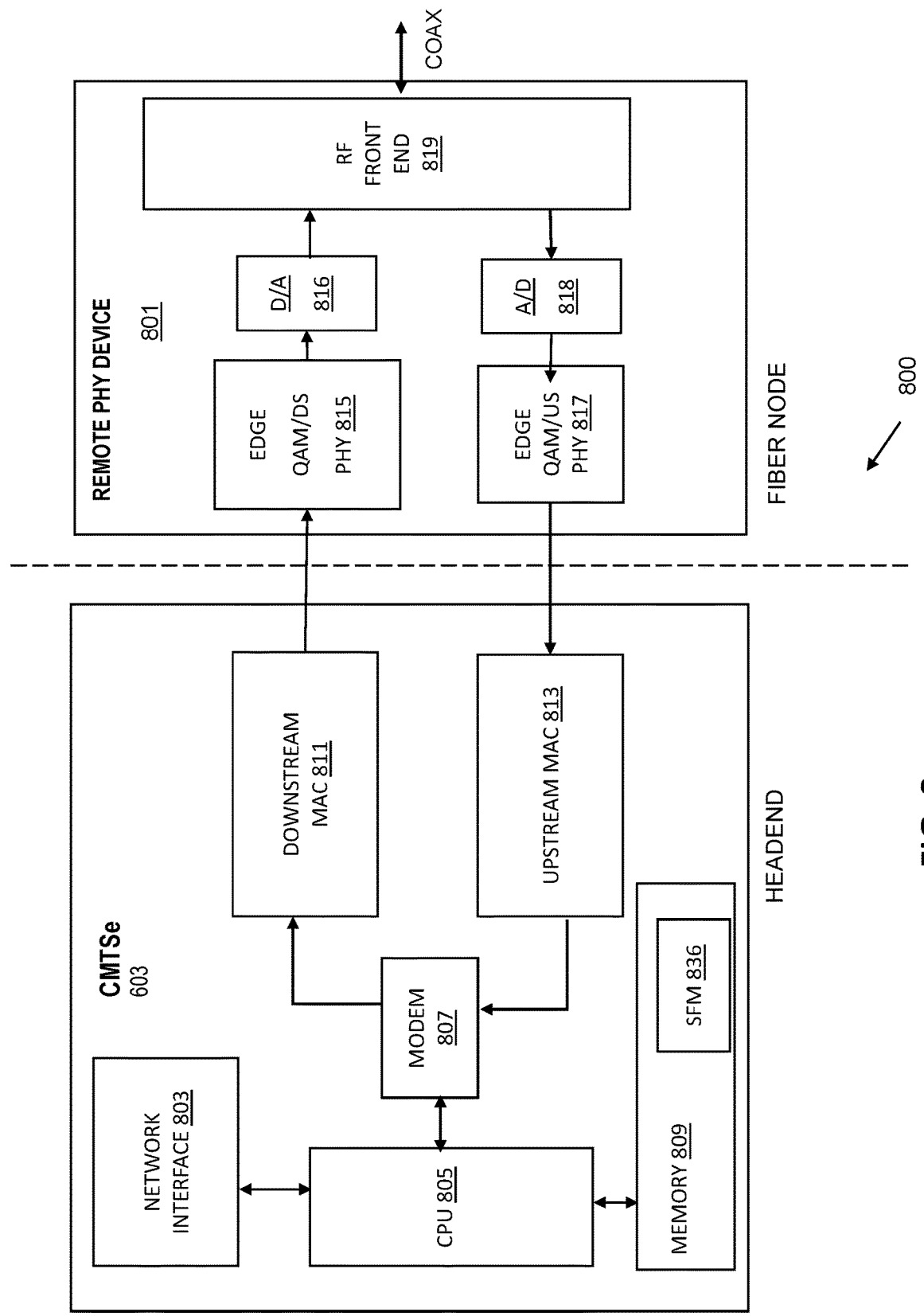
FIG. 8 is a block diagram illustrating one exemplary embodiment of network converged headend and remote PHY device (RPD) configuration with enhanced CMTS and communication/throughput functionality according to the present disclosure.

FIG. 8 is a block diagram illustrating one exemplary embodiment of network converged headend and remote PHY device (RPD) architecture 800 with enhanced CMTS and connectivity functionality according to the present disclosure. In the Remote PHY (R-PHY) architecture, which is a distributed access architecture, the PHY layer is moved from CMTSe (headend) to the fiber nodes within the HFC network. By decreasing the distance to client device, the R-PHY can achieve higher bandwidth and throughput than a modular or integrated CCAP architecture, and hence tit can provide higher bandwidth and throughput. It will be appreciated however that non RPD/RMD based variants may be used as well consistent with the present disclosure, such as via the modular CCAP or integrated CCAP architectures. In such architectures, the PHY and MAC layers are implemented in the headend.

As illustrated, the architecture 800 includes one CMTSe module 603 physically located at the headend, and one or more R-PHY modules physically located at fiber nodes. The CMTSe device 603 includes a processor 805, modem 807 (which may be integrated in the CPU 805, or implemented as a separate processor or ASIC as shown), RF front end 819, downstream MAC 811, upstream MAC 813, upstream PHY 817, RF front end 818, memory 809, and service flow management (SFM) logic 836 integrated in memory module 809. Additionally, the exemplary embodiment 800 includes a network interface 803 that interfaces CMTSe 603 to connect to a data network (e.g., MSO backbone and/or other network as described in FIGS. 6-7).

The components of the CMTSe device 603 shown in FIG. 8 may be individually or partially implemented in software, firmware or hardware.

In the exemplary embodiment, the processor(s) 805, 807 may include one or more of a digital signal processor, microprocessor, field-programmable gate array, GPU, or plurality of processing components mounted on one or more substrates. The processor may also comprise an internal cache memory, and is in communication with a memory subsystem 809, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor(s) 805, 807.

The downstream MAC 811 adds overhead (e.g., MAC address, Automatic Repeat request (ARQ)) to data, and divides the date stream into MAC frames. Likewise, an US MAC 813 is provided for data traffic sent from e.g., the CMe(s).

The SFM logic 836, among other functions, identifies the transmitted packets from the CBSDe 631 (via the CMe 625), reads the header fields to determine the packet type (e.g., BS associated), and allocates the required service flows and resources to the serving CMe. Also, depending on the type of the received packet from the CMe, the CMTSe 603 prioritizes the various service flows. As described previously, in one embodiment, the data identified as associated with the CBDSe (such as by IP packet header inspection) is allocated to a CBDSe-specific service flow established between the CMTSe and CMe, although this is not a requirement of practicing the various other aspects of the invention.

In the RPD, the Edge QAM/Downstream PHY module 815 receives the MAC data from the module 811, adds redundancy (e.g., Forward Error Control Coding (FEC)) to the data, and converts the data to PHY layer data and video signals (e.g., 16QAM, 256,QAM). The D/A device 816 converts the digital received signal from module 815, and converts it to analog signal to be converted to RF signals by RF front end unit 819. The A/D module 818 receives the analog baseband signals from RF front end unit 819, and converts it to digital signal. The upstream PHY module 817 converts the received base baseband signal constellation to data bits. The data bits from PHY module 817 are divided in MAC frames by upstream MAC module 813, and decoded by modem IM 807.

The RF front end 819 includes RF circuits to operate in e.g. DOCSIS 3.1 or 4.0 supported frequency spectrum (5-42 MHz upstream, 43-366 MHz VOD, SVD, broadcast channels, 367-750 MHz, 751 MHz-1.2 GHz downstream). The modem 807 generates the upstream and downstream PHY/MACH control and data, timing, and synchronization signals. The CPU 805 is the main processing component in the CMTSe device 603; it generates the signal to control other components in the CMTSe 603 and the network (including the various CMe to which it is connected), fetches and stores data from memory 809, and generates the signals and commands for the network interface 803.

Base Station Apparatus—

Figure 9:
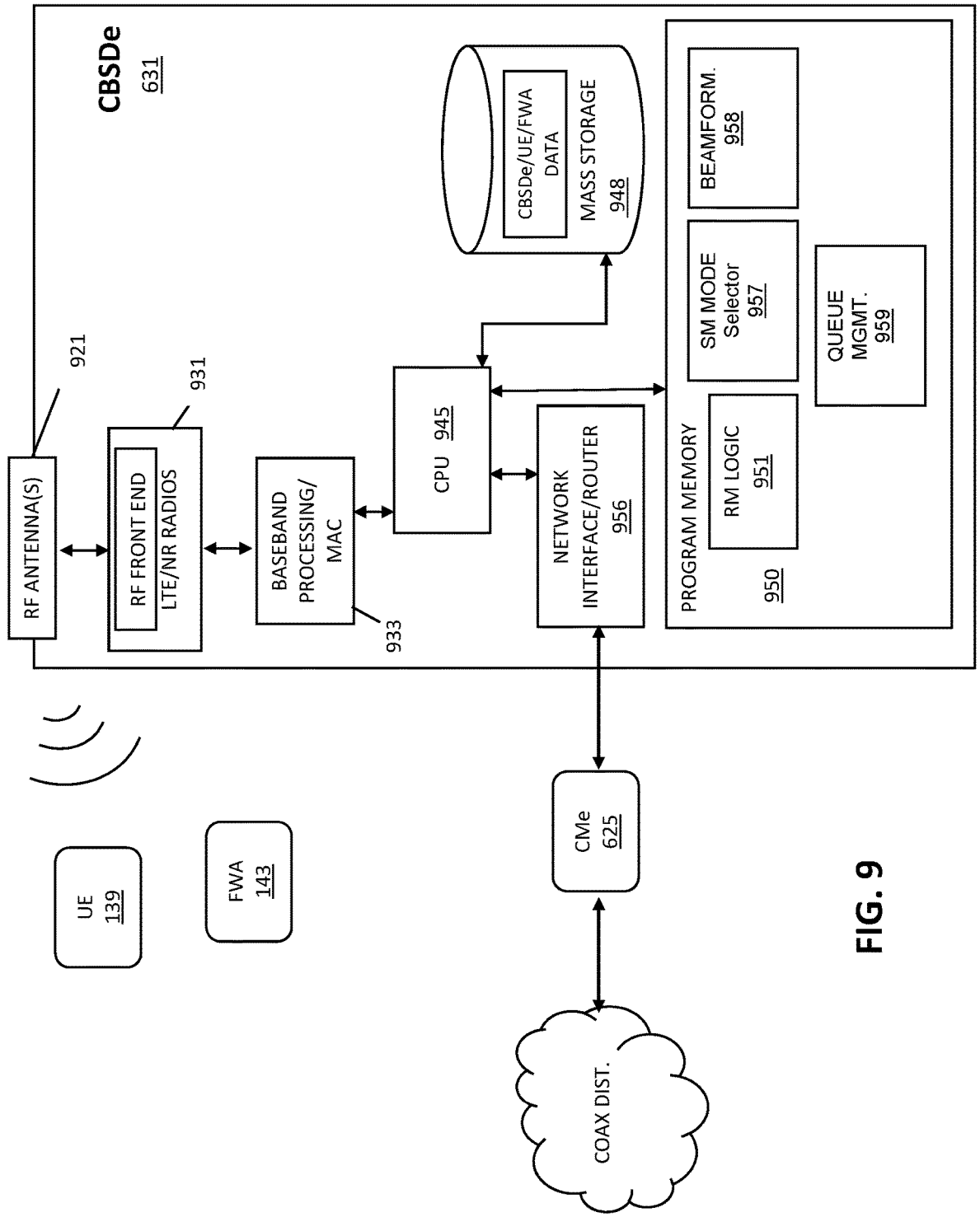
FIG. 9 is a block diagram illustrating one exemplary embodiment of base station (e.g., CBSDe) apparatus configured for provision of enhanced communication and throughput functions according to the present disclosure.

FIG. 9 is a block diagram illustrating one exemplary embodiment of base station (e.g., CBSDe) apparatus configured for provision of enhanced connectivity according to the present disclosure.

As shown, the CBSDe 631 includes, inter alia, a processor apparatus or subsystem 945, a program memory module 950, mass storage 948, RPC logic 906, one or more network interfaces 956, as well as one or more radio frequency (RF) devices 931 having, inter alia, antenna(e) 921 and one or more 4G/5G radio(s).

At a high level, the CBSDe maintains in effect two "stacks"; (i) a CBRS-compliant stack for communication of the CBSDe (acting as a CBRS-compliant entity) with other CBRS entities such as SAS/DP, according to e.g., the Signaling Protocols and Procedures for Citizens Broadband Radio Service (CBRS): Spectrum Access System (SAS) - Citizens Broadband Radio Service Device (CBSD) Interface Technical Specification—Document WINNF-TS-0016, Version V1.2.1. 3, January 2018, incorporated herein by reference in its entirety; and (ii) a 3GPP-compliant LTE/LTE-A/5G NR "stack" (acting as a EUTRAN eNB or 5G gNB) communications with 3GPP-compliant UEs (mobile devices 139).

As illustrated, the CBSDe device 631 includes RM logic 951, SM logic 957, beamforming selection logic 958, and queue/buffer management logic 959.

The RM logic 951 includes a variety of functions including evaluation of the configuration data received from the CMe relating to DL modulation order (discussed in detail previously herein), and the (optional) designation of IP packets within the CBSDe and transmission to the CMTSe 603 via the CMe 625. In this latter process, the PM logic 951 adds a base station "identifier" or other designator in the IP packet header that denotes the packet type and the base station identity (either generically or specifically as desired). In some embodiments, the RM logic 951 may be configured to add additional marking or identifiers to certain packets, so as to e.g., associate them with a particular function or service flow established within the CMe. Alternatively, the RM 951 may simply address certain packets to certain sockets or ports within the CMe.

The SM logic 957 and beamforming logic 958 perform respective SM and beamforming analysis and selection functions, such as those described previously herein with respect to FIGS. 5B and 5C, respectively. The queue management logic 959 is in this embodiment tasked with queue/buffer management, including e.g., DL queues managed on a per-UE or per service flow basis as previously described.

In the exemplary embodiment, the processor 945 may include one or more of a digital signal processor, microprocessor, field-programmable gate array, GPU or plurality of processing components mounted on one or more substrates. The processor 905 may also comprise an internal cache memory, and is in communication with a memory subsystem 950, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor. Other embodiments may implement such functionality within dedicated hardware, logic, and/or specialized co-processors (not shown).

The RF antenna(s) 921 are configured to detect and transceive signals from radio access technologies (RATs) in the service area or venue with which the CBSDe 631 is associated. For example, LTE (including, e.g., LTE, LTE-A, LTE-U, LTE-LAA) signals may be used as the basis of communication between the CBSDe 631 and the various mobile devices (e.g., UEs 139) or FWA 143. The antenna(s) 921 may include multiple spatially diverse individual elements in e.g., a MIMO- or MISO-type configuration, such that spatial diversity of the transceived signals can be utilized for e.g., increase in coverage area. Moreover, the spatial multiplexing (to increase throughput) and beamforming functions are executed via the antennae and radio(s) as described elsewhere herein.

In the exemplary embodiment, the radio interface(s) 931 comprise one or more LTE/5G-based radios compliant with 3GPP. Additional unlicensed, licensed, or quasi-licensed air interfaces may also be used within the CBSDe, including e.g., Wi-Fi, non-CBRS band LTE, 5G NR, or others. Moreover, the LTE radio functionality may be extended to incipient 3GPP-based 5G NR protocols; e.g., at maturation of LTE deployment and when 5G NR-enabled handsets are fielded, such adaptation being accomplished by those of ordinary skill given the contents of the present disclosure. As a brief aside, NG-RAN or "NextGen RAN (Radio Area Network)" is part of the 3GPP "5G" next generation radio system. 3GPP is currently specifying Release 17 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core). As such, 5G NR capable CBSDe may also find significant utility in prioritized scheduling of some IP packets within the DOCSIS backhaul system as described herein.

The RF radios 931 in one embodiment comprises a digitally controlled RF tuner capable of reception of signals via the RF front end (receive chain) of the RF radio(s) in the aforementioned bands, including in one variant simultaneous reception (e.g., both 2.300 to 2.500 and 3.550 to 3.700 GHz bands at the same time).

Figure 9A:
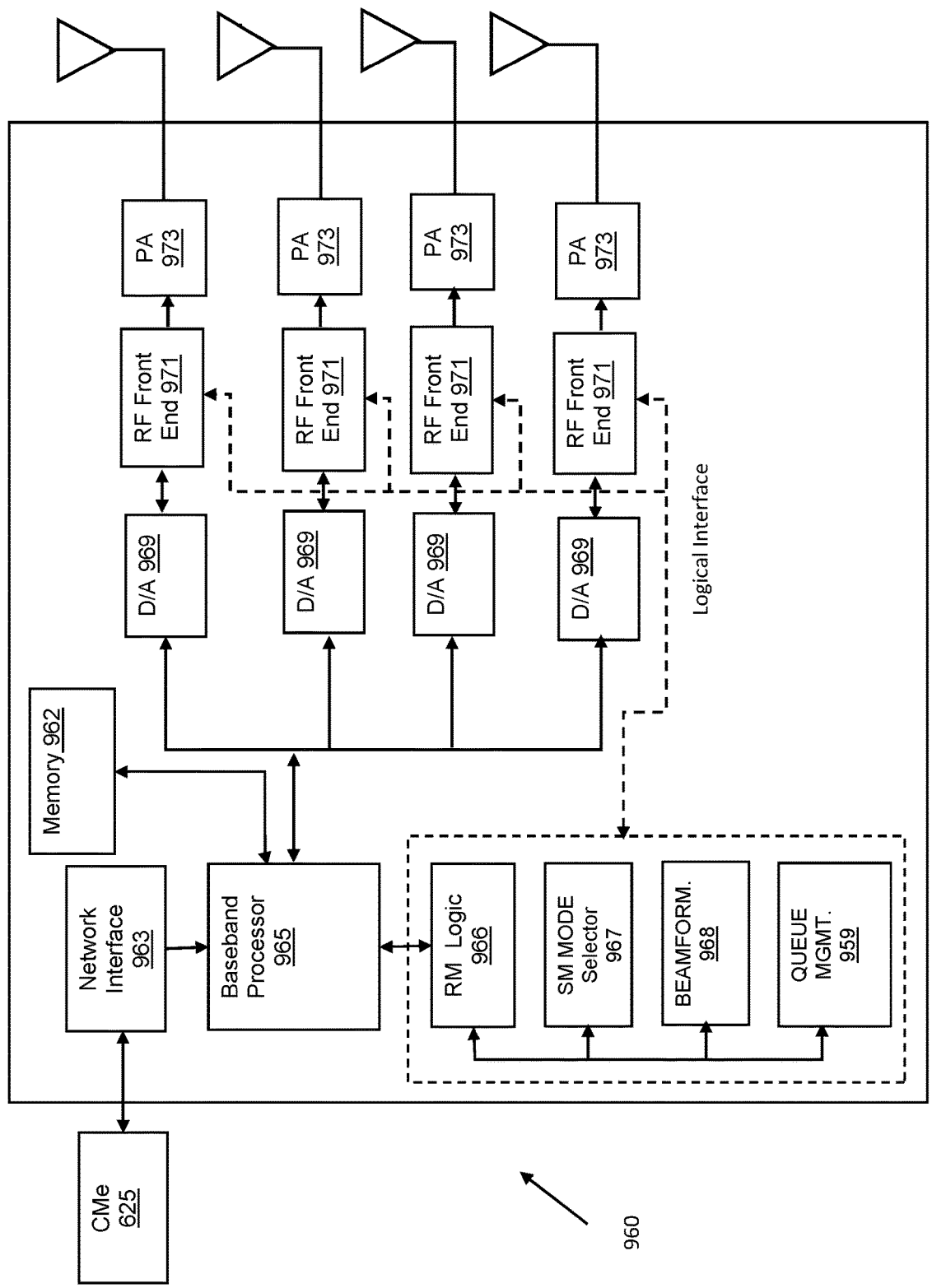
FIG. 9A is a block diagram illustrating one exemplary implementation of the base station (e.g., CBSDe) of FIG. 9, illustrating different antenna and transmit/receive chains thereof.

FIG. 9A is a functional block diagrams illustrating an exemplary implementation of the CBSDe/xNBe 631 of FIG. 9.

As illustrated, the device 900 includes baseband processor 965, one or more D/A 969, one or more RF front end 971, one or more power amplifier 973, RM logic 966, SM logic 967, and beamforming selection logic 968. Additionally, the exemplary embodiment 900 includes a network interface 963 that interfaces the CBSD/xNB 900 to connect to a data network via e.g., a CMe 625.

The components of CBSD/xNB 900 shown in FIG. 9 may be individually or partially implemented in software, firmware or hardware. The RF front end 971 includes RF circuits to operate in e.g., quasi-licensed or unlicensed spectrum (e.g., CBRS GAA or PAL, NR-U, C-Band, etc.). The digital baseband signals generated by the baseband processor 905 are converted from digital to analog by D/As 969. The front-end modules 913 convert the analog baseband signals radio received from D/As 969 to RF signals to be transmitted on the antennas. The baseband processor 965 includes baseband signal processing and radio control functions, including in one variant physical layer and Layer 2 functions such as media access control (MAC). The Power Amplifiers (PA) 973 receives the RF signal from RF front ends 911, and amplify the power high enough to compensate for path loss in the propagation environment.

The Rate Matcher (RM) logic 966 is configured in this implementation such that if the data received from the CMe indicates use of a modulation type or order that is not supported by 3GPP, the CBSDe will adapt by e.g., changing the modulation order to the maximum modulation order supported by 3GPP such that the input and output data rates remains the same. If this is insufficient, in order the maintain the same input and output rate, the RM 536 will recommend to the SM selector logic 967 to increase the number of active antennas to increase throughput via spatial multiplexing. In the event that more drastic throughput changes are needed, the beamforming logic is utilized (such as in the method described previously with respect to FIG. 5C) to provide limited-duration and optionally UE-specific beamforming using e.g., all available antennae and transmission chains (in this embodiment, four (4), although it will be appreciated that more or less of each may be utilized).

CMe Apparatus—

Figure 10:
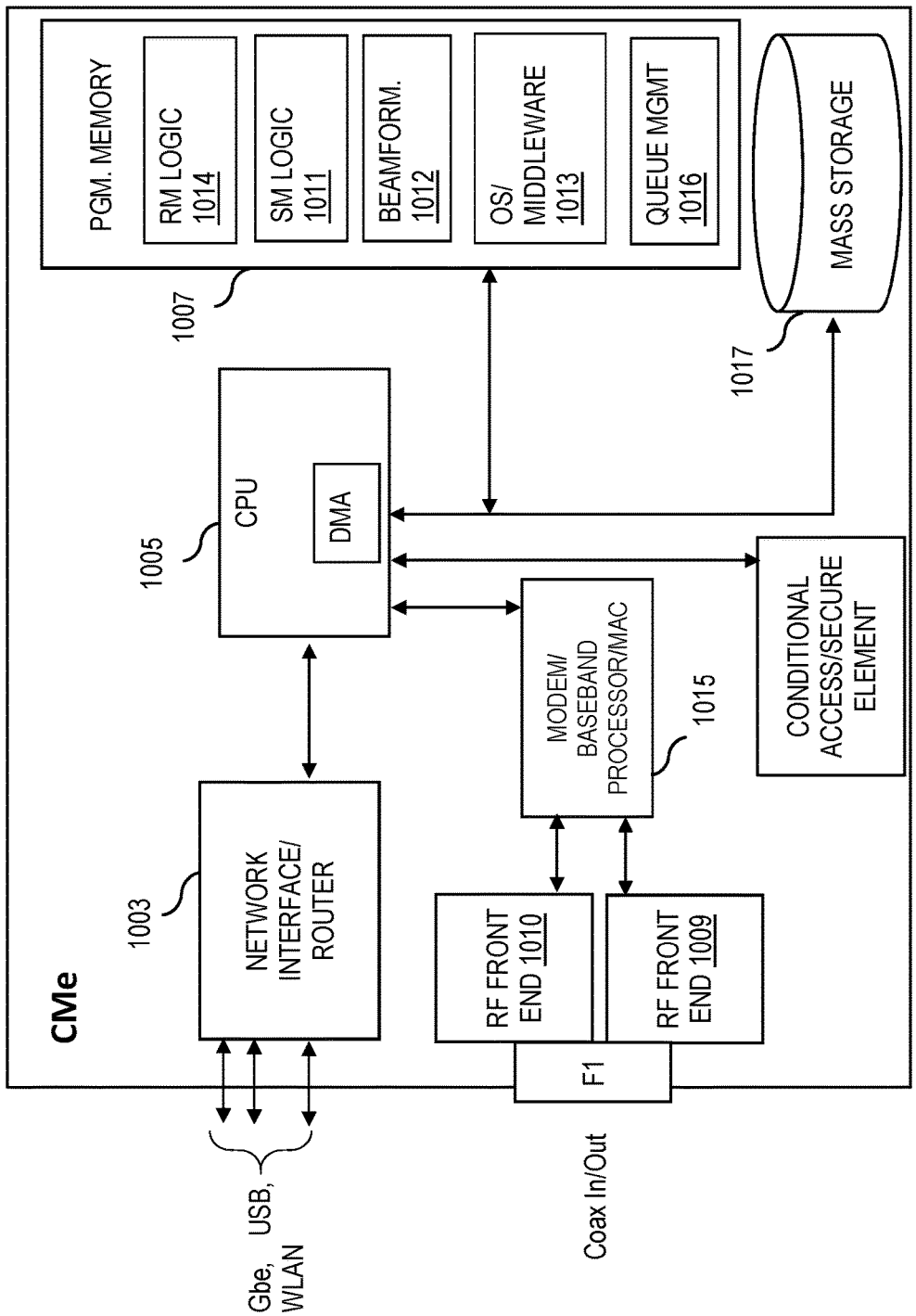
FIG. 10 is a block diagram illustrating one exemplary embodiment of a cable modem (CMe) apparatus configured for provision of enhanced communication and throughput functions according to the present disclosure.

FIG. 10 is a block diagram illustrating one exemplary embodiment of a cable modem (CMe) apparatus 625 configured for provision of enhanced communication and data throughput functionality according to the present disclosure.

At high level, the CMe apparatus 625 includes, inter alia, a processor apparatus 1005, a program memory module 1007, mass storage 1017, one or more RF front ends 1009, 1010 for processing RF signals received and transmitted over the coaxial "last mile" network, baseband processor/modem chipset 1015, as well as one or more network interfaces 1003 such as, Gigabit Ethernet or other LAN/WLAN connectivity, support of home or premises gateways, DSTBs, 3GPP small cells, etc. within the premises, etc.

The RF modules 1009, 1010 include a heterodyne-based transmitter/receiver architecture generally symmetrical to the transmitter/receiver of the enhanced CMTSe/node 413 discussed previously; i.e., impedance matching circuitry, diplexer, synchronization circuit, tilt, etc. are used as part of the CMe RF front ends, as well as RF tuner apparatus. The RF front ends are used to convert the received signal from frequency bands (366-750 MHz and 750 MHz-1.2 GHz) to baseband, and the inverse for transmission. A common F1-type connector for interface between the coaxial network and RF front end(s) is shown, although other approaches may be used as well.

Moreover, while two separate RF front ends 1010, 1009 are shown in this embodiment, a single device covering the entirety of the desired frequency range may be used with generally equal success.

The network interface module 1003 may include for example GbE Ethernet/WLAN/USB ports, which allows interface between the CMe module and premises devices such as CBSDe devices 631, WLAN routers, DSTB devices, computers, etc., to support data interchange between the CMe and the device.

In the exemplary embodiment, the host processor (CPU) 1005 may include one or more of a digital signal processor, microprocessor, GPU, field-programmable gate array, or plurality of processing components mounted on one or more substrates. The processor 1005 may also comprise an internal cache memory, and is in communication with a memory subsystem 1007, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 1005, including the OS and middleware 1013 (e.g., executing a Linux or other kernel).

The processor 1005 is configured to execute at least one computer program stored in memory 1007 (e.g., a non-transitory computer readable storage medium); in the illustrated embodiment, such programs include logic to implement the prioritized or dedicated service flow management functionality described previously herein (including beamforming logic 1012, and spatial multiplexing (SM) logic 1011 for implementing the previously described beamforming and SM functions, passing configuration data to the CBSDe/xNB, as well as coordinating with CMTSe logic for implementation and utilization of the prioritized service flows, including maintaining service flow QoS parameters, target port/socket data, and other relevant data). Other embodiments may implement such functionality within dedicated hardware, logic, and/or specialized co-processors or ASICs (not shown).

The CMe is further configured with queue management (QM) logic 1016, which is used to monitor and maintain service flow queue levels (e.g., for UL data queues where the CMe is equipped to perform upstream data queue metric monitoring/analysis) as previously described herein.

The CMe logic also includes a hierarchy of software layers and communication protocols to enable RF carrier detection, reporting and synchronization, communication with the CMTSe 603, interaction with PHY layer and hardware, routing data from/to the HFC network, Layer 2/3 functions, etc.

Exemplary Communications Flow—

Figure 11A:
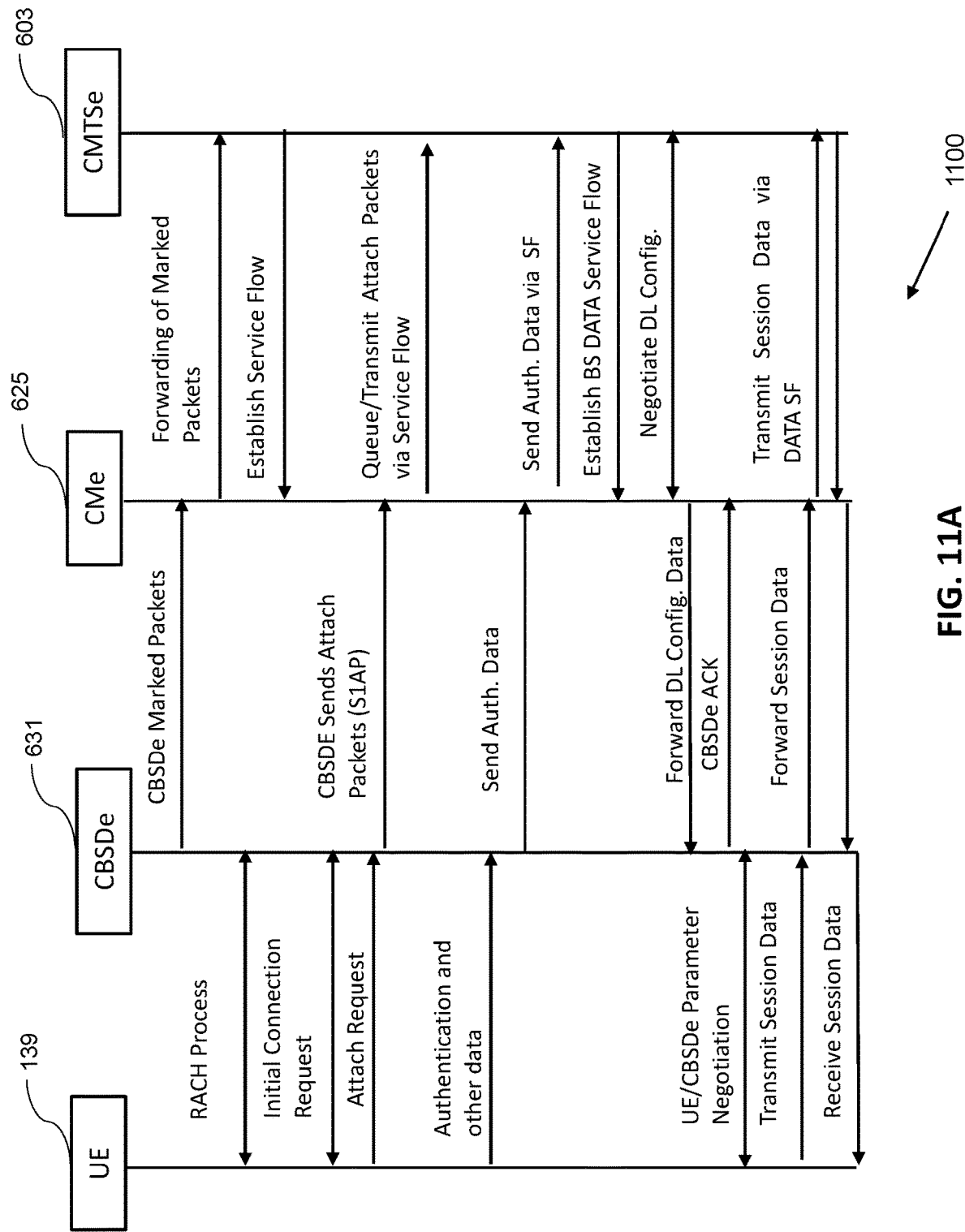
FIGS. 11A-11B are a ladder diagram illustrating communication and data flow between UE, CBSDe, CMe, and CMTSe, according to one embodiment of the present disclosure.
Figure 11B:
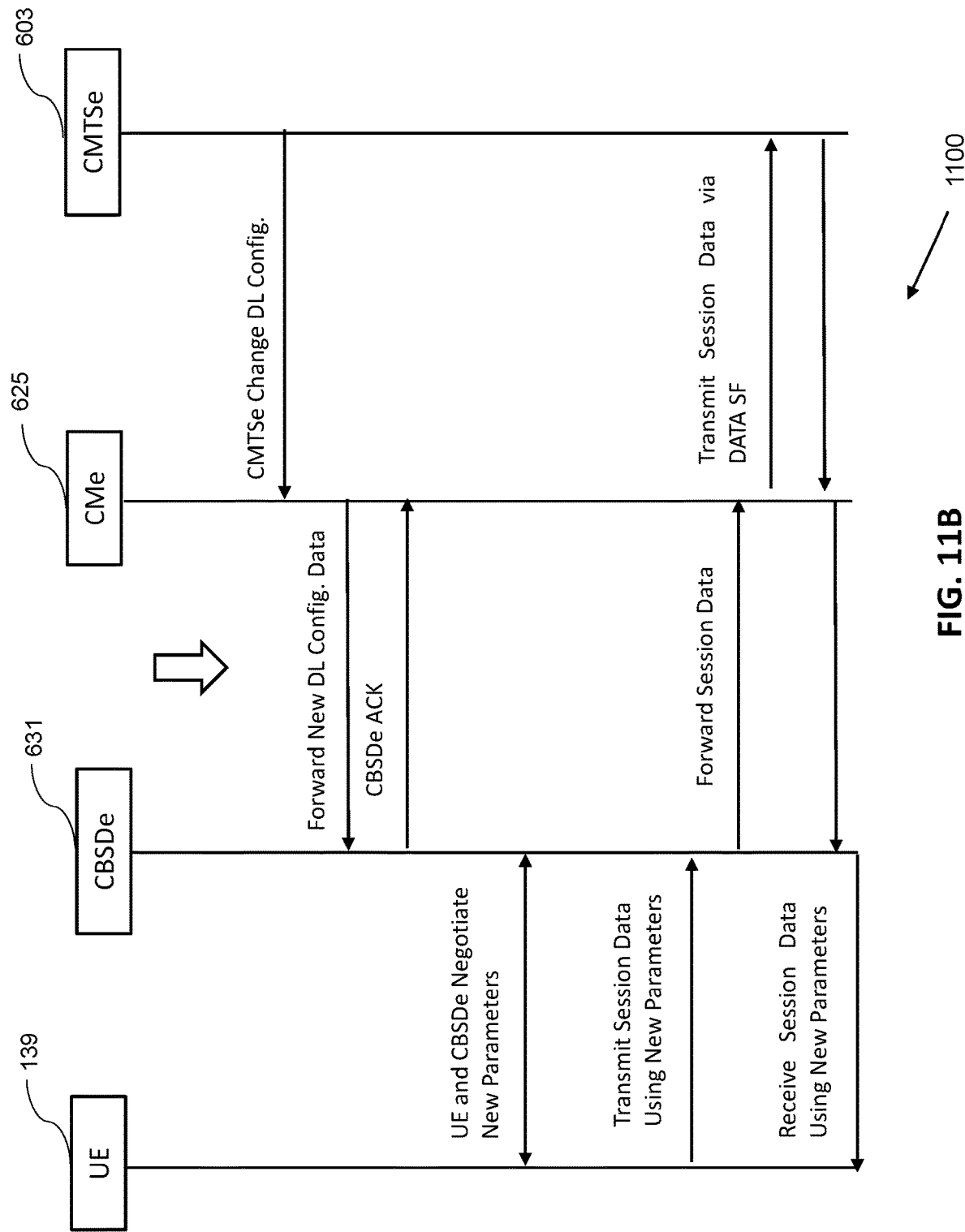

FIGS. 11A-11B are a ladder diagram illustrating communication and flow between UE, CBSDe, CMe, and CMTSe according to one embodiment of the present disclosure. In the illustrated ladder diagram of FIG. 11A, a UE first attaches (e.g., RACH) and authenticates to the network core via the CBSDe and CMe (and CMTSe). Packets sent from the CBSDe to the CMe are marked in this embodiment, which enables the CMTSe to establish one or more new service flows dedicated to the CBSDe (and its clients), including for session data to be transacted between the UE and e.g., a distant network server, such as via an application executing on the UE. In one approach, the methods and apparatus for establishing prioritized UE connection described in co-owned and co-pending U.S. patent application Ser. No. 16/996,496 filed Aug. 18, 2020, 2020 and entitled "METHODS AND APPARATUS FOR WIRELESS DEVICE ATTACHMENT IN A MANAGED NETWORK ARCHITECTURE," previously incorporated herein may be used consistent with the present disclosure.

Once the CMTSe and CMe negotiate the DL (and UL) channels, the configuration data is passed to the CBSDe, which then uses the data as necessary to negotiate any required changes to the air interface between the UE and the CBSDe.

Subsequently, if the CMTSe changes e.g., the DL configuration (e.g., modulation order) as shown in FIG. 11B, the new configuration data is again passed to the CBSDe by the CMe, and the UE and CBSDe perform any requisite negotiation and changes to the air interface in order to optimize use of the backhaul (e.g., perform "rate matching" as previously described herein).

mmWave Embodiments—

Additionally, with advent of ever-higher frequencies being utilized within wireless standards such as 3GPP 5G NR Release 17 (which supports inter alia, mmWave frequencies on the order of 52.6-71 GHz), signal propagation and antenna utilization become even more critical. While higher frequencies provide much enhanced data rates as compared to lower frequencies, they are also increasingly susceptible to propagation losses due to e.g., interposed objects such as buildings, billboards, trees/foliage, and even transitory objects such as humans or cars. Such mmWave systems generally require a clear LOS (line of sight) for optimal operation, and due to their relative "delicacy" in alignment and propagation issues, may require even more frequent intervention in order to maintain a suitable level of signal strength and throughput.

Hence, in other embodiments of the disclosure, mmWave air interfaces may be used by the CBSDe and served UE (where so equipped) as an additional "safety valve" for e.g., DL buffer overflow. In one such variant, the air interface operating in e.g., an unlicensed or quasi-licensed band such as 2.4 GHz or 3.6 GHz which, for whatever reason, has insufficient capacity to prevent undesired buffer conditions, can hand off to an established connection operating in mmWave bands (e.g., unlicensed 5G NR mmWave bands) so as to enable rate matching. Such may be the case where the antenna array associated with the LTE radio of the CBSDe is limited, damaged, SM is not available or unsuitable, high levels of interference from other devices are present, etc.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of operating a packet network infrastructure comprising at least one packet receiver apparatus and at least one packet transmitter apparatus, the computerized method comprising;
   identifying, at the at least one packet receiver apparatus, a first type of equipment connected to the at least one packet transmitter apparatus;
   based at least on the identifying, causing establishment of at least one service flow between the at least one packet receiver apparatus and the at least one packet transmitter apparatus; and
   causing data relating to the at least one service flow to be transmitted to the connected first type of equipment, the transmitted data configured to enable the connected first type of equipment to perform at least one of a rate-matching or configuration optimization process with respect to at least downlink data transmissions to one or more computerized client devices thereof;
   wherein the at least one of the rate-matching or the configuration optimization process:
   is based at least on a determination of an expected throughput; and
   comprises use of at least one of a beamforming or spatial multiplexing mode based at least in part on the determination.

2. The computerized method of claim 1, wherein the packet network infrastructure comprises a DOCSIS (data over cable service specification) packet data system, the at least one packet receiver apparatus comprises a cable modem termination system (CMTS), and the at least one packet transmitter apparatus comprises a cable modem (CM).

3. The computerized method of claim 2, wherein the identifying, at the at least one packet receiver apparatus, the first type of equipment connected to the at least one packet transmitter apparatus comprises identifying a wireless base station connected to the CM based at least in inspecting one or more packet headers for packets transmitted to the CM, the one or more packet headers of the transmitted packets having been marked with a prescribed designation by the wireless base station.

4. The computerized method of claim 3, wherein the wireless base station comprises a 3GPP (Third Generation Partnership Project) compliant base station operating within a quasi-licensed frequency band, and the causing of the data relating to the at least one service flow to be transmitted to the connected first type of equipment comprises causing downlink (DL) modulation order data to be transmitted.

5. The computerized method of claim 4, wherein the causing of the data relating to the at least one service flow to be transmitted to the connected first type of equipment further comprises causing additional downlink (DL) channel data to be transmitted, the additional DL channel data and the DL modulation order data enabling the 3GPP compliant base station to estimate a maximum DL throughput.

6. The computerized method of claim 5,
wherein the enablement of the connected first type of equipment to perform the at least one of the rate-matching or the configuration optimization process with respect to the at least downlink data transmissions to the one or more computerized client devices thereof comprises enablement of the 3GPP compliant base station to:
perform at least one rate determination process to determine whether the 3GPP compliant base station can support a target maximum data rate for a DL channel; and
based at least on the performance, selectively implement one or more of: (i) a modulation order change for the DL channel; (ii) the spatial multiplexing mode for the DL channel; or (iii) the beamforming on the DL channel.

7. The computerized method of claim 5, wherein the causing of the establishment of the at least one service flow between the at least one packet receiver apparatus and the at least one packet transmitter apparatus comprises establishing a prioritized service flow dedicated to the 3GPP compliant base station only.

8. Computerized packet receiver apparatus, comprising:
at least one wireless interface apparatus;
processor apparatus in data communication with the at least one wireless interface apparatus; and
storage apparatus in data communication with the processor apparatus, the storage apparatus comprising at least one computer program comprising a plurality of instructions that is configured to, when executed by the processor apparatus, cause the computerized packet receiver apparatus to:
identify a first type of equipment in data communication with at least one packet transmitter apparatus;
based at least on the identification, cause establishment of at least one service flow between the computerized packet receiver apparatus and the at least one packet transmitter apparatus; and
cause data relating to the at least one service flow to be transmitted to the first type of equipment, the transmitted data configured to enable the first type of equipment to perform at least one of a rate-matching or configuration optimization process with respect to at least downlink data transmissions to one or more computerized client devices thereof, wherein the at least one of the rate-matching or the configuration optimization process (i) is based at least on a determination of an expected throughput, and (ii) comprises use of at least one of a beamforming or spatial multiplexing mode based at least in part on the determination.

9. The computerized packet receiver apparatus of claim 8, wherein:
the computerized packet receiver apparatus is within a packet network infrastructure, the packet network infrastructure comprising a DOCSIS (data over cable service specification) packet data system;
the computerized packet receiver apparatus comprises a cable modem termination system (CMTS); and
the at least one packet transmitter apparatus comprises a cable modem (CM).

10. The computerized packet receiver apparatus of claim 9, wherein the identification of the first type of equipment connected to the at least one packet transmitter apparatus comprises identification of a wireless base station connected to the CM based at least in inspecting one or more packet headers for packets transmitted to the CM, the one or more packet headers of the transmitted packets having been marked with a prescribed designation by the wireless base station.

11. The computerized packet receiver apparatus of claim 10, wherein the wireless base station comprises a 3GPP (Third Generation Partnership Project) compliant base station operating within a quasi-licensed frequency band, and the causation of the data relating to the at least one service flow to be transmitted to the first type of equipment comprises causation of downlink (DL) modulation order data to be transmitted.

12. The computerized packet receiver apparatus of claim 11, wherein the causation of the data relating to the at least one service flow to be transmitted to the first type of equipment further comprises causation of additional downlink (DL) channel data to be transmitted, the additional DL channel data and the DL modulation order data enabling the 3GPP compliant base station to estimate a maximum DL throughput.

13. The computerized packet receiver apparatus of claim 12, wherein the enablement of the first type of equipment to perform the at least one of the rate-matching or the configuration optimization process with respect to the at least downlink data transmissions to the one or more computerized client devices thereof comprises enablement of the 3GPP compliant base station to:
perform at least one rate determination process to determine whether the 3GPP compliant base station can support a target maximum data rate for a DL channel; and
based at least on the performance, selectively implement one or more of: (i) a modulation order change for the DL channel; (ii) the spatial multiplexing mode for the DL channel; or (iii) the beamforming on the DL channel.

14. The computerized packet receiver apparatus of claim 12, wherein the causation of the establishment of the at least one service flow between the computerized packet receiver apparatus and the at least one packet transmitter apparatus comprises establishment of a prioritized service flow dedicated to the 3GPP compliant base station only.

15. Computer readable apparatus comprising a non-transitory storage medium, the non-transitory storage medium comprising at least one computer program having a plurality of instructions, the plurality of instructions configured to, when executed on a processing apparatus, cause a computerized packet receiver apparatus to:
identify a first type of equipment in data communication with at least one packet transmitter apparatus;
based at least on the identification, cause establishment of at least one service flow between the computerized packet receiver apparatus and the at least one packet transmitter apparatus; and
cause data relating to the at least one service flow to be transmitted to the first type of equipment, the transmitted data configured to enable the first type of equipment to perform at least one of a rate-matching or configuration optimization process with respect to at least downlink data transmissions to one or more computerized client devices thereof, wherein the at least one of the rate-matching or the configuration optimization process (i) is based at least on a determination of an expected throughput, and (ii) comprises use of at least one of a beamforming or spatial multiplexing mode based at least in part on the determination.

16. The computer readable apparatus of claim 15, wherein:
the computerized packet receiver apparatus is within a packet network infrastructure, the packet network infrastructure comprising a DOCSIS (data over cable service specification) packet data system;
the computerized packet receiver apparatus comprises a cable modem termination system (CMTS); and
the at least one packet transmitter apparatus comprises a cable modem (CM).

17. The computer readable apparatus of claim 16, wherein the identification of the first type of equipment connected to the at least one packet transmitter apparatus comprises identification of a wireless base station connected to the CM based at least in inspecting one or more packet headers for packets transmitted to the CM, the one or more packet headers of the transmitted packets having been marked with a prescribed designation by the wireless base station.

18. The computer readable apparatus of claim 17, wherein:
the wireless base station comprises a 3GPP (Third Generation Partnership Project) compliant base station operating within a quasi-licensed frequency band, and the causation of the data relating to the at least one service flow to be transmitted to the first type of equipment comprises causation of downlink (DL) modulation order data to be transmitted; and
the causation of the data relating to the at least one service flow to be transmitted to the first type of equipment further comprises causation of additional downlink (DL) channel data to be transmitted, the additional DL channel data and the DL modulation order data enabling the 3GPP compliant base station to estimate a maximum DL throughput.

19. The computer readable apparatus of claim 18, wherein the enablement of the first type of equipment to perform the at least one of the rate-matching or the configuration optimization process with respect to the at least downlink data transmissions to the one or more computerized client devices thereof comprises enablement of the 3GPP compliant base station to:
perform at least one rate determination process to determine whether the 3GPP compliant base station can support a target maximum data rate for a DL channel; and
based at least on the performance, selectively implement one or more of: (i) a modulation order change for the DL channel; (ii) the spatial multiplexing mode for the DL channel; or (iii) the beamforming on the DL channel.

20. The computer readable apparatus of claim 18, wherein the causation of the establishment of the at least one service flow between the computerized packet receiver apparatus and the at least one packet transmitter apparatus comprises establishment of a prioritized service flow dedicated to the 3GPP compliant base station only.

* * * * *